US010622726B2

(12) United States Patent
Moon et al.

(10) Patent No.: US 10,622,726 B2
(45) Date of Patent: Apr. 14, 2020

(54) WAVEGUIDE SLOT ARRAY ANTENNA

(71) Applicant: KMW INC., Hwaseong-si (KR)

(72) Inventors: Young-Chan Moon, Hwaseong-si (KR); Chang-Seob Choi, Hwaseong-si (KR); Chi-Back Ryu, Hwaseong-si (KR); Yong-Won Seo, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 233 days.

(21) Appl. No.: 15/591,133

(22) Filed: May 10, 2017

(65) Prior Publication Data

US 2017/0244173 A1 Aug. 24, 2017

Related U.S. Application Data

(63) Continuation of application No. PCT/KR2015/012036, filed on Nov. 10, 2015.

(30) Foreign Application Priority Data

Nov. 11, 2014 (KR) ........................ 10-2014-0156116
Jun. 1, 2015 (KR) ........................ 10-2015-0077610

(51) Int. Cl.
*H01Q 21/06* (2006.01)
*H01Q 15/24* (2006.01)
(Continued)

(52) U.S. Cl.
CPC ........... *H01Q 21/064* (2013.01); *H01Q 13/10* (2013.01); *H01Q 13/106* (2013.01);
(Continued)

(58) Field of Classification Search
CPC .. H01Q 21/005; H01Q 21/064; H01Q 21/245; H01Q 15/246; H01Q 13/106; H01Q 13/10
See application file for complete search history.

(56) References Cited

U.S. PATENT DOCUMENTS 5,502,453 A * 3/1996 Tsukamoto .......... H01Q 21/064 343/756
6,028,562 A * 2/2000 Guler ..................... H01Q 13/10 343/770
(Continued)

FOREIGN PATENT DOCUMENTS

CN 101919118 A 12/2010
CN 103947044 A 7/2014
(Continued)

OTHER PUBLICATIONS

International Search Report for PCT/KR2015/012036, dated Feb. 24, 2016, and its English translation.
(Continued)

*Primary Examiner* — Ab Salam Alkassim, Jr.

(57) ABSTRACT

The present invention provides a waveguide slot array antenna having an excitation slot arrangement radiating a signal corresponding to an operating frequency in a radiation plate, the waveguide slot array antenna comprising: a first auxiliary radiation plate installed on a main radiation plate and rotating a polarization plane of a signal radiated from the excitation slot arrangement of the main radiation plate; and a second auxiliary radiation plate installed on the first auxiliary radiation plate and distributing and radiating the signal, the polarization plane of which has been rotated in the first auxiliary radiation plate.

10 Claims, 26 Drawing Sheets

(51) Int. Cl.

| | |
|---|---|
| ***H01Q 21/00*** | (2006.01) |
| ***H01Q 13/10*** | (2006.01) |
| ***H01Q 21/24*** | (2006.01) |

(52) U.S. Cl.
CPC ......... *H01Q 15/246* (2013.01); *H01Q 21/005* (2013.01); *H01Q 21/245* (2013.01)

(56) References Cited

U.S. PATENT DOCUMENTS

| | | | | |
|---|---|---|---|---|
| 6,127,985 | A * | 10/2000 | Guler | H01Q 13/10 343/770 |
| 6,285,335 | B1 * | 9/2001 | Snygg | H01Q 21/0087 343/770 |
| 9,190,737 | B2 * | 11/2015 | Sano | H01Q 13/10 |
| 9,490,545 | B2 * | 11/2016 | Montgomery | H01Q 15/248 |
| 10,236,587 | B2 * | 3/2019 | Kim | H01Q 13/06 |
| 10,431,902 | B2 * | 10/2019 | You | H01Q 13/10 |
| 2002/0101385 | A1 * | 8/2002 | Huor | H01Q 21/005 343/770 |
| 2004/0080463 | A1 * | 4/2004 | Jeong | H01Q 1/523 343/770 |
| 2007/0139772 | A1 * | 6/2007 | Wang | G02B 5/3083 359/487.03 |
| 2010/0109960 | A1 * | 5/2010 | Guler | H01Q 15/244 343/756 |
| 2013/0120205 | A1 * | 5/2013 | Thomson | H01Q 21/0075 343/776 |
| 2013/0120206 | A1 * | 5/2013 | Biancotto | H01Q 21/005 343/776 |
| 2014/0254976 | A1 * | 9/2014 | Thomson | H01P 1/173 385/11 |
| 2015/0015440 | A1 * | 1/2015 | Montgomery | H01Q 15/248 342/361 |
| 2015/0349431 | A1 * | 12/2015 | Odes | G06F 17/10 343/756 |
| 2017/0098892 | A1 * | 4/2017 | Kim | H01Q 13/06 |
| 2017/0271776 | A1 * | 9/2017 | Biancotto | H01Q 21/245 |
| 2018/0358709 | A1 * | 12/2018 | You | H01Q 21/064 |
| 2019/0305436 | A1 * | 10/2019 | Legay | H01Q 15/244 |

FOREIGN PATENT DOCUMENTS

| | | | |
|---|---|---|---|
| JP | 2002-217639 | A | 8/2002 |
| JP | 2011-15320 | A | 1/2011 |
| JP | 2011-503996 | A | 1/2011 |
| JP | 2011-044977 | A | 3/2011 |
| JP | 2011-142514 | A | 7/2011 |
| JP | 6-175720 | A | 4/2013 |
| JP | 2014-132729 | A | 7/2014 |
| JP | 2014-170989 | A | 9/2014 |
| KR | 10-0710708 | B1 | 4/2007 |
| KR | 10-0721871 | B1 | 5/2007 |
| KR | 10-2007-0088443 | A | 8/2007 |
| KR | 10-2009-0083458 | A | 8/2009 |
| KR | 10-1092846 | B1 | 12/2011 |
| KR | 10-2013-0099309 | A | 9/2013 |
| WO | 2013-072781 | A1 | 5/2013 |

OTHER PUBLICATIONS

Xiaoming Liu et al., "Polarization rotator of arbitrary angle based on simple slot-array", AIP Advances 5, 127142, pp. 1-6, Dec. 31, 2015.

Supplementary European Search Report for European Application No. 15858572.9 dated May 18, 2018.

Office Action dated Mar. 18, 2019 for Chinese Application No. 2015/80061383.6.

* cited by examiner

WAVEGUIDE SLOT ARRAY ANTENNA

CROSS REFERENCE TO RELATED APPLICATIONS

This application is a continuation of International Application No. PCT/KR2015/012036 filed on Nov. 10, 2015, which claims priorities to Korean Application No. 10-2014-0156116 filed on Nov. 11, 2014 and Korean Application No. 10-2015-0077610 filed on Jun. 1, 2015, the entire contents of which are incorporated herein by reference.

TECHNICAL FIELD

The present disclosure relates to a super high frequency transmitting and receiving antenna, and more particularly, to a waveguide slot array antenna.

BACKGROUND ART

Super high frequency transmitting and receiving antennas include a parabolic-type antenna, a microstrip antenna, a waveguide slot array antenna, and so forth. Among these antennas, a microstrip array antenna or a waveguide slot array antenna is mainly used for miniaturization through thickness reduction.

The microstrip array antenna has a microstrip patch array structure using a dielectric substrate, in which a loss of a transmitted or received signal is large depending on a loss coefficient of a dielectric based on characteristics of the dielectric substrate, and an ohmic loss of a conductor occurs, and the loss increases especially for a higher frequency, such that the use of the microstrip array antenna is avoided in a super high frequency band.

The waveguide slot array antenna has a structure in which a hole in the form of a slot is formed in a general waveguide, without using the dielectric substrate. Generally, a waveguide is a hollow metal pipe and a sort of high pass filter in which a guided mode has a specific cutoff frequency and a dominant mode is determined by a size of the waveguide. The waveguide has lower attenuation than a parallel two-wire line, a coaxial cable, etc., and thus is mostly used for high power in a microwave transmission line. The waveguide may have various cross-sectional shapes, depending on which the waveguide is classified into a circular waveguide, a quadrangular waveguide, an oval waveguide, and so forth.

Techniques related to the waveguide slot array antenna are disclosed in, for example, a Korean Patent Application No. 2006-18147 (entitled "Stacked Slot Array Antenna", filed by MOTONICS Co., Ltd. on Feb. 24, 2006 and invented by Taekwan Cho, et al.) or a Korean Patent Application No. 2007-7000182 (entitled "Planar Antenna Module, Triple Plate-Type Planar Array Antenna, and Triple Plate Line-Waveguide Converter", filed by Hitachi Chemical Company, Ltd., on Jan. 4, 2007, and invented by Oota Masahiko et al.).

FIG. 1A is a perspective view in which each layer of a conventional waveguide slot array antenna having a stacked multi-layer structure is partially cut. Referring to FIG. 1A, the conventional waveguide slot array antenna includes a feeding plate 11 in which an input feeding slot 112 is formed, a distribution plate 12 which is installed on the feeding plate 11 and in which a distributor and coupling slots 122 are formed, a main radiation plate 13 which is installed on the distribution plate 12 and in which a cavity structure and an excitation slot (or a radiation slot) 132 are formed, and an auxiliary radiation plate 14 which is installed on the main radiation plate 13 and in which a polarization slot 142 is formed to generate a polarized wave having a polarization plane inclined at 45 degrees (°).

Once a signal is input from the feeding slot 112 of the feeding plate 11, the input signal is distributed, for example, in an equal ratio, through the distribution plate 12, and each distributed signal is delivered to each cavity formed in the main radiation plate 13 through the coupling slots 122. The signal delivered to the cavity of the main radiation plate 13 is distributed and radiated in an equal ratio through, for example, four excitation slots 132 formed for each cavity. The excitation slots 132 are arranged to have a preset interval and preset arrangement therebetween according to an operating frequency.

In the auxiliary radiation plate 14 installed on the main radiation plate 13, the polarization slots 142, each of which one-to-one corresponds to each excitation slot 132 of the main radiation plate 13, is formed, and the signal delivered to the polarization slot 142 is rotated at 45 degrees when compared to radiation from the excitation slot 132 and is radiated to the space. That is, a wave polarized at 45 degrees in a vertical/horizontal direction is generated by the auxiliary radiation plate 14. Referring to a slot shape of the excitation slot 132, the excitation slot 132 has, for example, an approximately rectangular shape, and is formed in an erect position or posture in the vertical/horizontal direction, and for a slot shape of the polarization slot 142, the polarization slot 142 has a rectangular shape similar to the approximately rectangular shape of the excitation slot 132, but when compared to the slot shape of the excitation slot 132, the rectangular shape of the polarization slot 142 is formed in a position or posture mechanically rotated at 45 degrees in the vertical/horizontal direction and thus may be globally similar to a diamond shape. Such a structure may be regarded as a structure that forms one radiation slot by a combination of the excitation slot 132 and the polarization slot 142.

As such, to operate the conventional waveguide slot array antenna for vertical/horizontal polarization, the auxiliary radiation plate 14 is used and the polarization slot 142 of the auxiliary radiation plate 14 may have a rectangular shape rotated at 45 degrees with respect to the excitation slot 132 to rotate a polarization plane of a signal radiated from the excitation slot 132 at 45 degrees. With this structure, a side lobe component is significantly suppressed by a total length of a vertical/horizontal plane.

However, as the rectangular polarization slot 142 formed in the auxiliary radiation plate 14 is rotated at 45 degrees in the vertical/horizontal direction to have a shape similar to the diamond shape, an arrangement interval between the polarization slots 142 on the vertical/horizontal plane may fail to satisfy a proper distance criterion required when a wavelength of an operating frequency is considered. That is, as indicated by a in FIG. 1A, a distance, especially between the polarization slots 142 arranged diagonally to each other may increase. Such a structure may cause a grating lobe.

More specifically, in an array antenna, if a distance between arrays exceeds one wavelength, a specific radiation angle is produced at which signals radiated from respective radiation slots are in phase. A lobe produced in this case is called a grating lobe that is a sort of main lobe. The grating lobe is generated by a phase of an array element in the array antenna, and the phase is controlled by a distance between elements.

FIG. 1B shows a state in which a main lobe and a grating lobe are produced, for example, in positions P1 and P2 of two polarization slots located diagonally (having a distance of d therebetween) in FIG. 1A. Referring to FIG. 1B, when a phase difference between two paths is one wavelength λ, the grating lobe is produced at an angle rotated by θ from the main lobe. The generated angle may be simply expressed with the following equation.

$$\theta = \sin^{-1}\left(\frac{\lambda}{d}\right)$$

Due to the grating lobe, radiation pattern envelope (RPE) standards prescribed in corresponding countries may not be satisfied. Thus, a scheme for suppressing the grating lobe is required.

It may be possible to suppress the grating lobe by disposing multiple excitation slots on an identical antenna area where an arrangement interval between excitation slots is reduced, but in a conventional structure, the number of excitation slot arrays increases to a power of 2 depending on a distribution plate and a cavity structure that distributes a signal on a main radiation plate, showing some limitations in the design of arrangement of excitation slots.

SUMMARY

The present disclosure is proposed to solve the foregoing problems, and provides a waveguide slot array antenna that generates a polarized wave while effectively suppressing a grating lobe.

The present disclosure also provides a waveguide slot array antenna that freely implements an overall antenna structure by improving the degree of freedom as to the design of a slot array.

To achieve the foregoing objects, according to an aspect of the present disclosure, there is provided a waveguide slot array antenna having an excitation slot array that radiates a signal corresponding to an operating frequency in a main radiation plate, the waveguide slot array antenna including a first auxiliary radiation plate installed on the main radiation plate and configured to rotate a polarization plane of the signal radiated by the excitation slot array of the main radiation plate and a second auxiliary radiation plate installed on the first auxiliary radiation plate and configured to distribute and radiate the signal having the polarization plane rotated by the first auxiliary radiation plate.

The first auxiliary radiation plate may include an array of a first polarization slot formed to have a structure corresponding to the excitation slot array of the main radiation plate, and the first polarization slot may be structured to rotate a polarization plane of a signal radiated by a corresponding excitation slot.

The second auxiliary radiation plate may include an array of a plurality of second polarization slots formed for each first polarization slot of the first auxiliary radiation plate, and a distribution structure for distributing a signal radiated for each first polarization slot of the first auxiliary radiation plate to the plurality of second polarization slots corresponding to the first polarization slot is formed in the second auxiliary radiation plate.

The waveguide slot array antenna may further include a feeding plate which forms at least a part of a waveguide to be provided with an input signal and a distribution plate which includes a distribution waveguide structure coupled to the feeding plate to distribute the input signal to multiple coupling slots, in which the main radiation plate is installed on the distribution plate and includes multiple cavity structures for distributing a signal input through each coupling slot of the distribution plate in an equal ratio and exciting the distributed signal through the excitation slot array.

According to another aspect of the present disclosure, there is provided a waveguide slot array antenna including a distribution plate which includes a distribution waveguide structure for distributing an input signal to multiple coupling slots, and a radiation plate which is installed on the distribution plate and includes multiple cavity structures, each being configured corresponding to the multiple coupling slots to distribute the signal input through the multiple coupling slots of the distribution plate in an equal ratio and to excite the distributed signal through multiple excitation slot arrays, in which each of the multiple cavity structures is designed to be divided into four regions for distributing the signal provided to a corresponding coupling slot of the distribution plate to four parts, and a plurality of excitation slots are formed in each of the four regions.

As described above, the waveguide slot array antenna according to some embodiments of the present disclosure generates a polarized wave while effectively suppressing a grating lobe, thereby reducing an influence upon an adjacent device in an adjacent-fixed communication device.

Moreover, the waveguide slot array antenna according to some embodiments of the present disclosure may improve the degree of freedom as to the design of slot arrangement, allowing free implementation of an overall antenna structure. Hence, the unnecessary increase of the antenna size may be prevented, and processing complexity may be reduced by maintaining a proper arrangement level, thereby reducing a loss of time cost.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Hereinafter, exemplary embodiments of the present disclosure will be described in detail with reference to the accompanying drawings. In the following description, specific details such as detailed elements, etc., will be provided, but they are merely provided to help the overall understanding of the present disclosure and it would be obvious to those of ordinary skill in the art that modifications or changes may be made to the specific details within the scope of the present disclosure.

Figure 2:
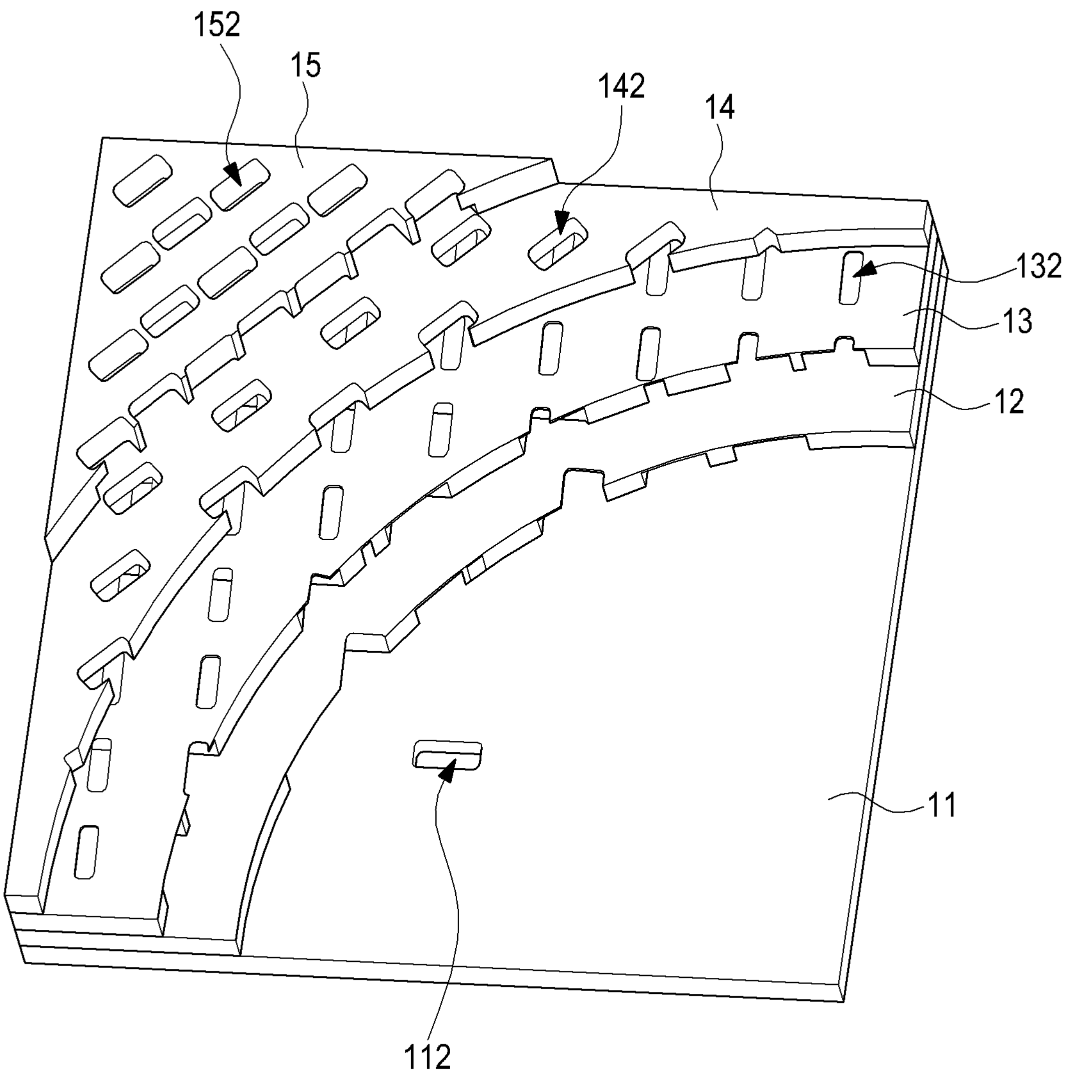
FIG. 2 is a perspective view in which each layer of a waveguide slot array antenna is partially cut according to a first embodiment of the present disclosure.

FIG. 2 is a perspective view in which each layer of a waveguide slot array antenna having a stacked multi-layer structure is partially cut according to a first embodiment of the present disclosure. Referring to FIG. 2, the waveguide slot array antenna according to the first embodiment of the present disclosure, like a conventional waveguide slot array antenna, may include a feeding plate 11 in which an input feeding slot 112 is formed, a distribution plate 12 which is installed on the feeding plate 11 and has a distributor and a coupling slot 122 formed therein, and a main radiation plate 13 which is installed on the distribution plate 12 and has a cavity structure and an excitation slot (or a radiation slot) 132 formed therein. According to characteristics of the present disclosure, the waveguide slot array antenna may further include a first auxiliary radiation plate 14 which is installed on the main radiation plate 13 and has a first polarization slot 142 formed therein to generate a polarized wave having a polarization plane inclined at 45 degrees and a second auxiliary radiation plate 15 which is installed on the first auxiliary radiation plate 14 and has a second polarization slot 152 formed therein to distribute and radiate the polarized wave generated in the first auxiliary radiation plate 14.

Like in the conventional waveguide slot array antenna, once a signal is input through the feeding slot 112 of the feeding plate 11, the input signal is distributed in an equal ratio through the distribution plate 12, and each distributed signal is delivered to each cavity formed in the main radiation plate 13 through the coupling slots 122. The signal delivered to the cavity of the main radiation plate 13 is distributed and radiated, for example, in an equal ratio through, for example, four excitation slots 132 formed for each cavity. The excitation slots 132 are arranged to have a preset interval and preset arrangement therebetween according to an operating frequency.

In the first auxiliary radiation plate 14 installed on the main radiation plate 13, like in the conventional waveguide slot array antenna, the first polarization slots 142 are formed to one-to-one correspond to the respective excitation slots 132 of the main radiation plate 13. The first polarization slot 142 is structured such that an approximately quadrangular (or rectangular) slot is formed in a posture mechanically rotated at 45 degrees with respect to the excitation slot 132. With this structure, for the signal delivered to the first polarization slot 142, a polarized wave signal is generated to have a polarization plane rotated at 45 degrees relative to the signal radiated from the excitation slot 132.

According to the first embodiment of the present disclosure, in the second auxiliary radiation plate 15 installed on the first auxiliary radiation plate 14, a plurality of (e.g., two) second polarization slots 152 are formed to correspond to each first polarization slot 142 of the first auxiliary radiation plate 14 and a distribution structure for distributing a signal to the plurality of corresponding second polarization slots 152 for each first polarization slot 142 is formed. Shapes (and postures) of the first polarization slot 142 and the plurality of second polarization slots 152 may be the same as one another. With this structure, the polarized wave generated in the first polarization slot 142 is distributed and radiated through the second polarization slots 152.

It can be seen that as a whole, the first auxiliary radiation plate 14 and the second auxiliary radiation plate 15 further include a structure for rotating a signal excited by the excitation slot 132 of the main radiation plate 13 such that the signal has a polarization plane inclined at 45 degrees and an extended slot array structure using an electric field plane or magnetic field plane signal distribution structure.

Figure 3:
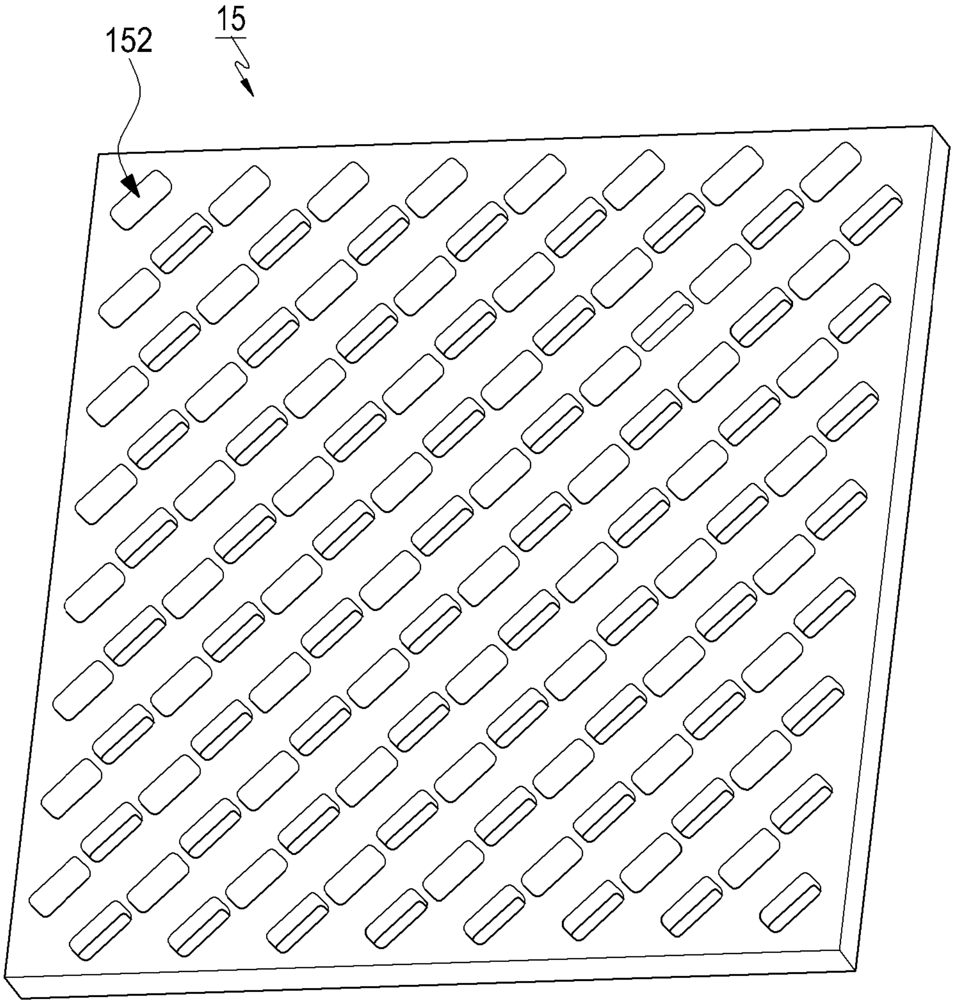
FIG. 3 is a perspective view of a side of a second auxiliary radiation plate shown in FIG. 2.
Figure 4:
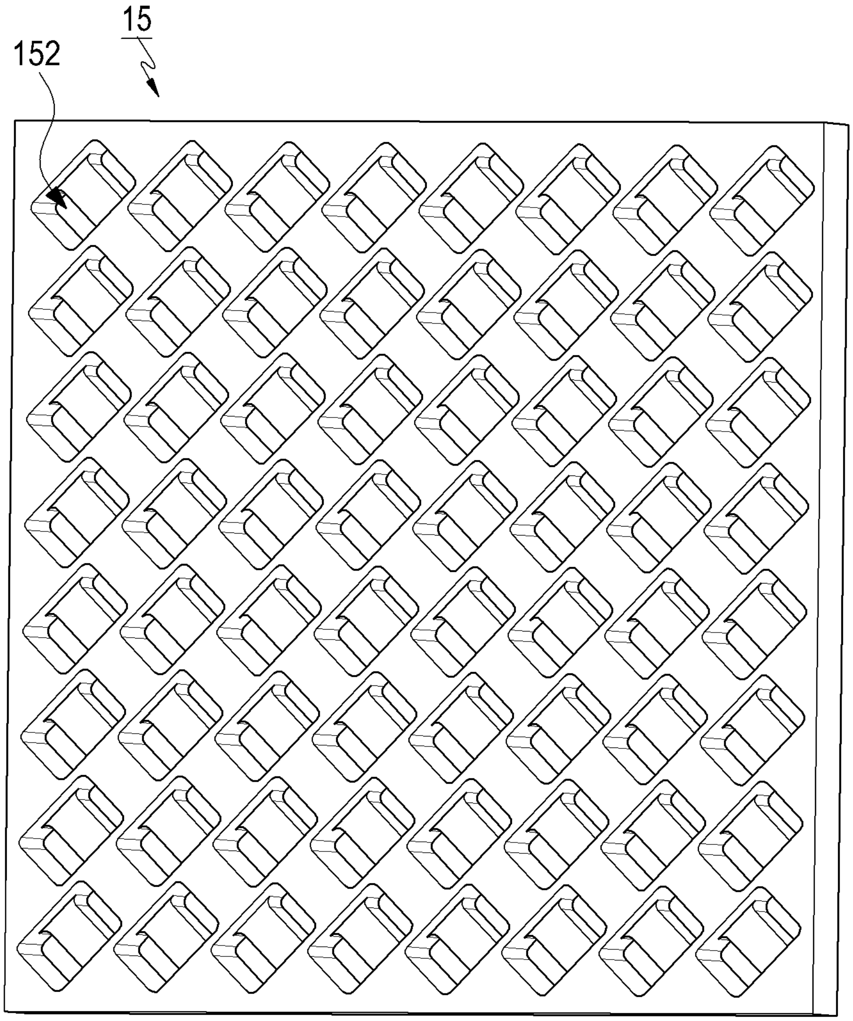
FIG. 4 is a perspective view of another side of a second auxiliary radiation plate shown in FIG. 2.
Figure 5:
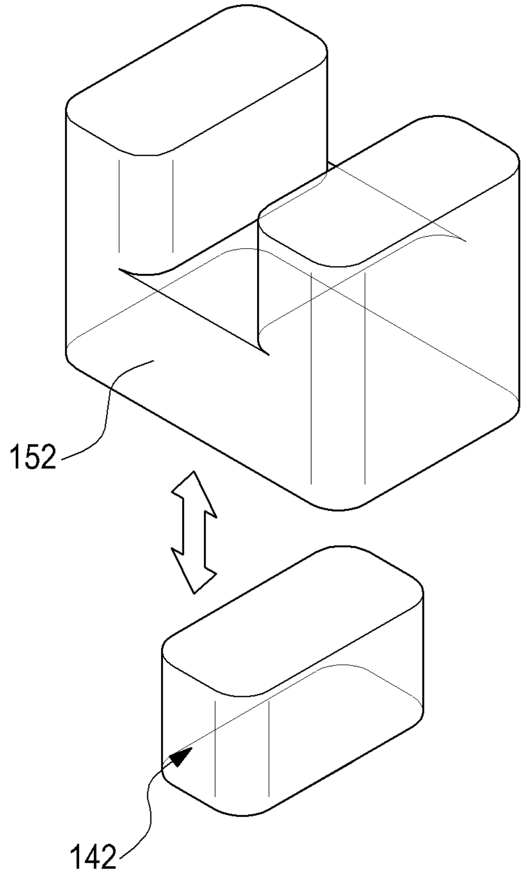
FIG. 5 is a perspective view showing a connection relationship between a second polarization slot of a second auxiliary radiation plate and a first polarization slot of a first auxiliary radiation plate in FIG. 2.
Figure 6:
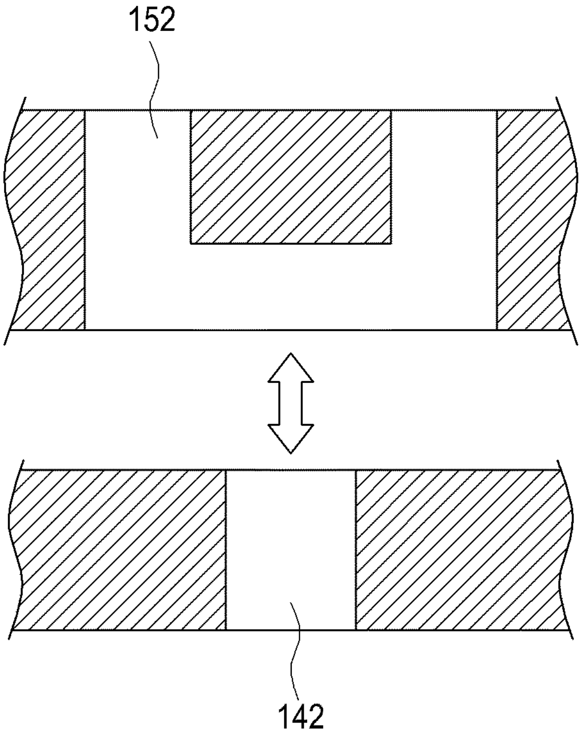
FIG. 6 is a side structural view showing a connection relationship between a second polarization slot of a second auxiliary radiation plate and a first polarization slot of a first auxiliary radiation plate in FIG. 2.

FIG. 3 is a perspective view of a top side (e.g., a front side along a signal radiation direction) of the second auxiliary radiation plate 15, FIG. 4 is a perspective view of a bottom side (e.g., a rear side along the signal radiation direction) of the second auxiliary radiation plate 15, and FIGS. 5 and 6 are a perspective view and a side view showing a connection relationship between the second polarization slot 152 of the second auxiliary radiation plate 15 and the first polarization slot 142 of the first auxiliary radiation plate 14, respectively. To be more specific regarding structures and operations of the second auxiliary radiation plate 15 and the second polarization slot 152 with reference to FIGS. 3 through 6, an electric field of a signal delivered from the excitation slot 132 of the main radiation plate 13 is fixed after rotated at 45 degrees in the first polarization slot 142 of the first auxiliary radiation plate 14, and then the signal is delivered toward the second polarization slot 152 of the second auxiliary radiation plate 15.

The signal delivered to the second auxiliary radiation plate 15 is distributed through the distribution structure formed under the second polarization slots 152, such that each distributed signal is provided to the plurality of second polarization slots 152. Such a distribution structure may have a structure branched vertically or horizontally with respect to an electric field plane. The signal distributed and provided to the second polarization slot 152 is radiated to the space and thus may be expressed in an overall antenna radiation pattern.

When viewed from a top side of the second auxiliary radiation plate 15, an arrangement interval between the second polarization slots 152 may be, for example, a half of an arrangement interval between the first polarization slots 142 of the first auxiliary radiation plate 14 according to a branched plane. That is, with this structure, an arrangement interval on a vertical/horizontal plane between the second polarization slots 152 formed in the second auxiliary radiation plate 15 may sufficiently satisfy a criterion of within one wavelength with respect to an operating frequency, thus sufficiently suppressing a grating lobe.

Figure 7:
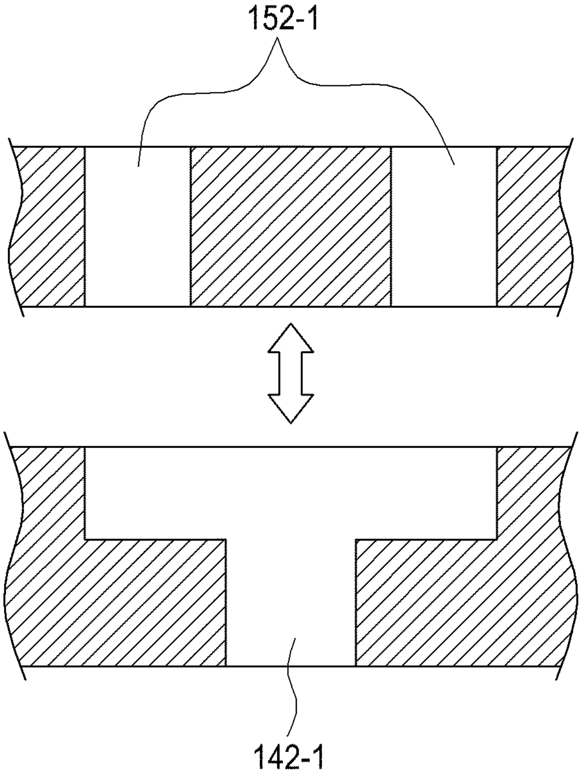
FIG. 7 is a side structural view showing a connection relationship in a modified structure between a second polarization slot of a second auxiliary radiation plate and a first polarization slot of a first auxiliary radiation plate in FIG. 2.

FIG. 7 is a perspective view showing a modified structure of the second polarization slot 152 of the second auxiliary radiation plate 15 and the first polarization slot 142 of the first auxiliary radiation plate 14 in FIG. 2. Referring to the modified structure shown in FIG. 7, a second polarization slot 152-1 is formed in the second auxiliary radiation plate 15 without a distribution structure under the second polarization slot 152; instead, the distribution structure is formed above a first polarization slot 142-1 of the first auxiliary radiation plate 14. That is, in the modified structure shown in FIG. 7, the second polarization slot 152-1 is formed in the second auxiliary radiation plate 15, and the first auxiliary radiation plate 14 has the first polarization slot 142-1 and the distribution structure formed above the first polarization slot 142-1.

When the first auxiliary radiation plate 14 and the second auxiliary radiation plate 15 are coupled to each other, a shape of a waveguide path formed by the first polarization slot 142-1, the distribution structure, and the second polarization slot 152-1 to deliver an internal signal therethrough is substantially the same as a shape of a waveguide path formed by the structure shown in FIGS. 2 through 6, and signal delivery characteristics are identical.

Figure 8:
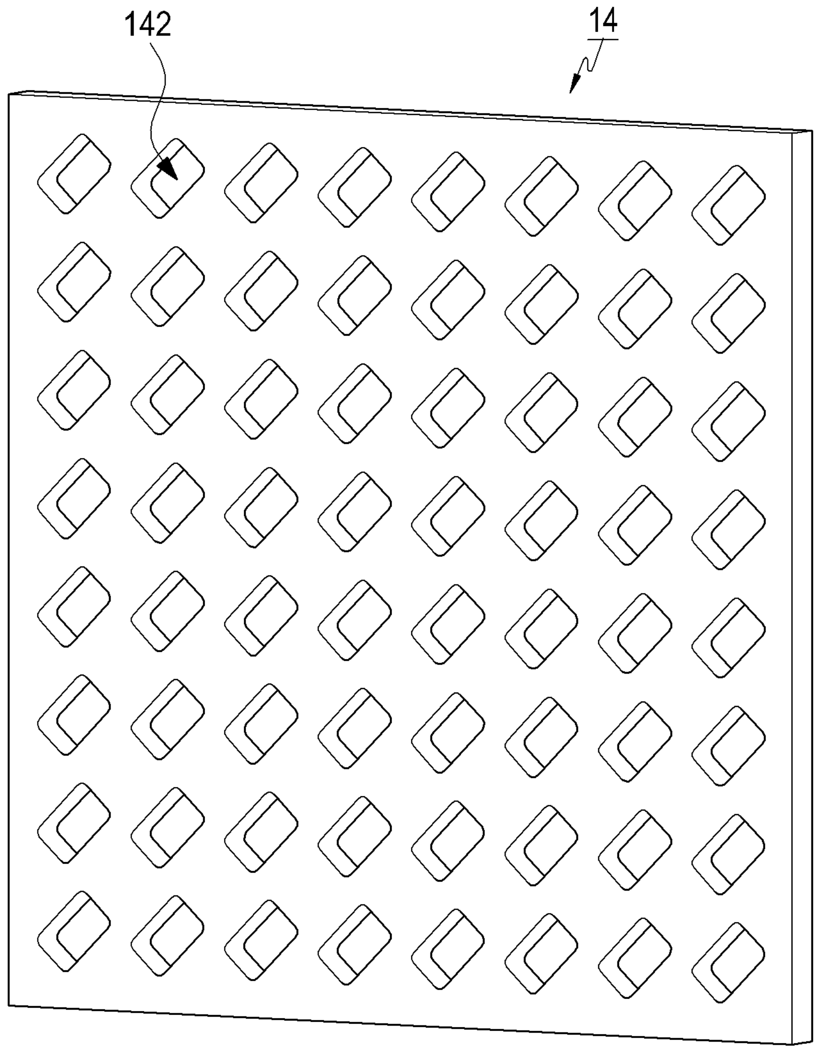
FIG. 8 is a perspective view of a side of a first auxiliary radiation plate shown in FIG. 2.
Figure 9:
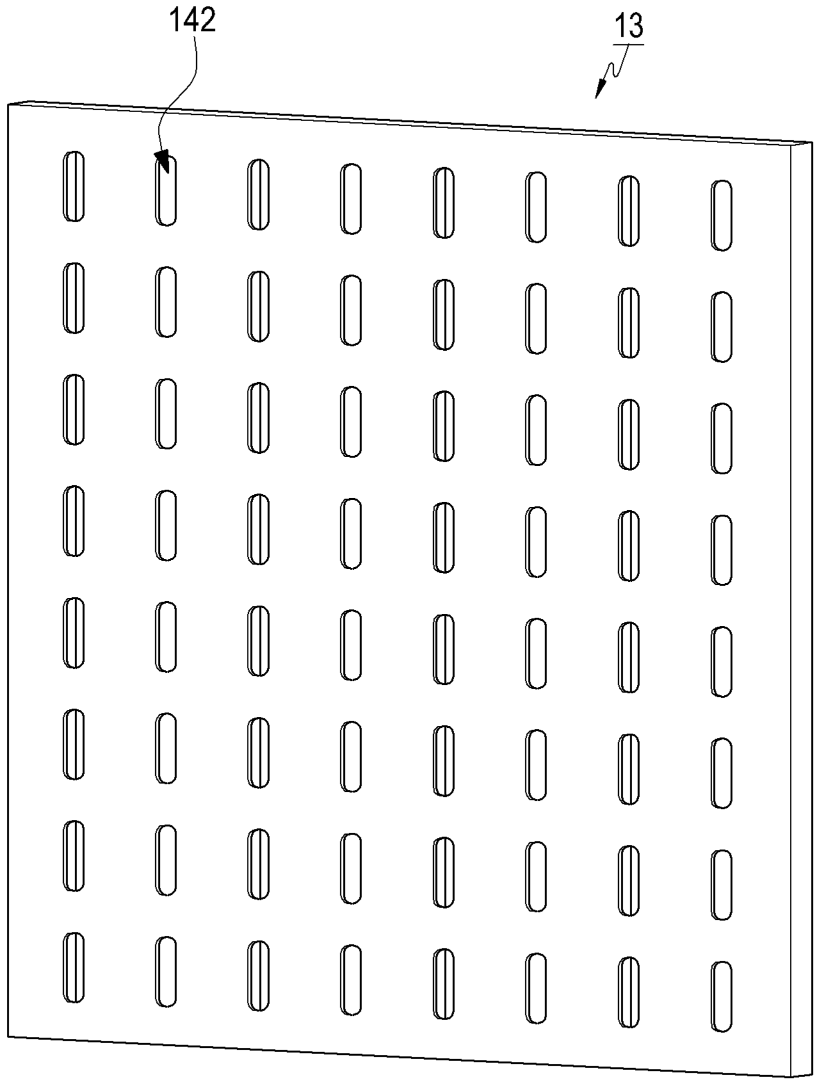
FIG. 9 is a perspective view of a radiation plate of FIG. 2 in a side direction.
Figure 10:
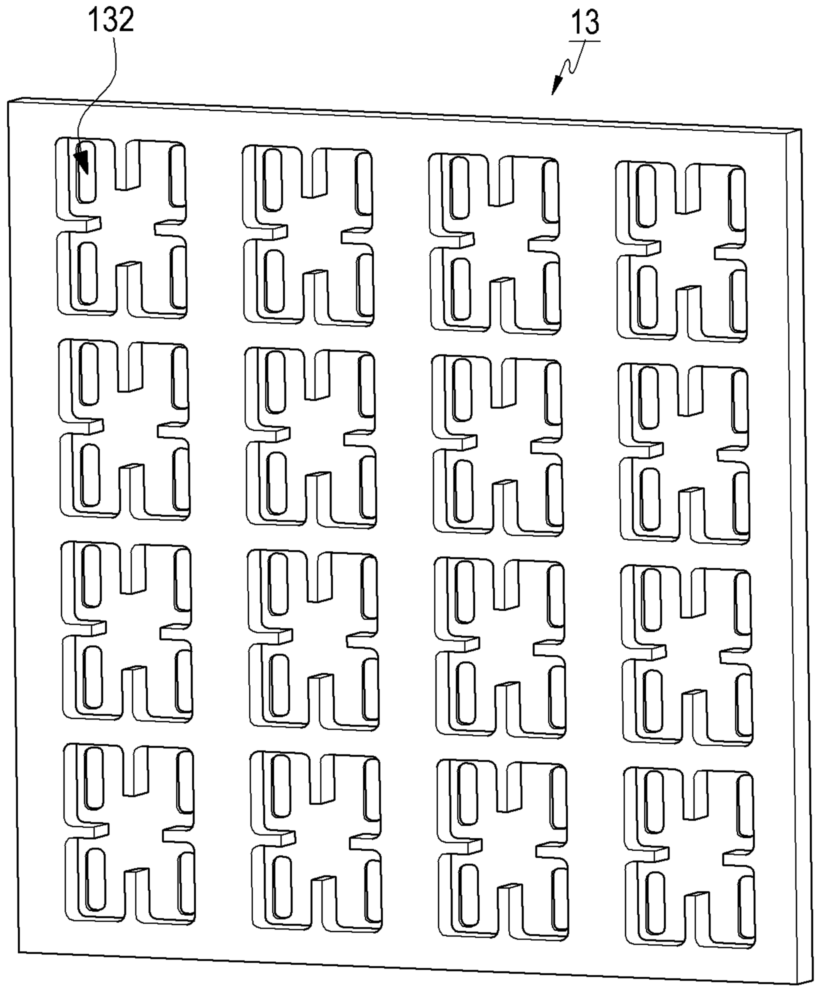
FIG. 10 is a perspective view of a radiation plate of FIG. 2 in another side direction.
Figure 11:
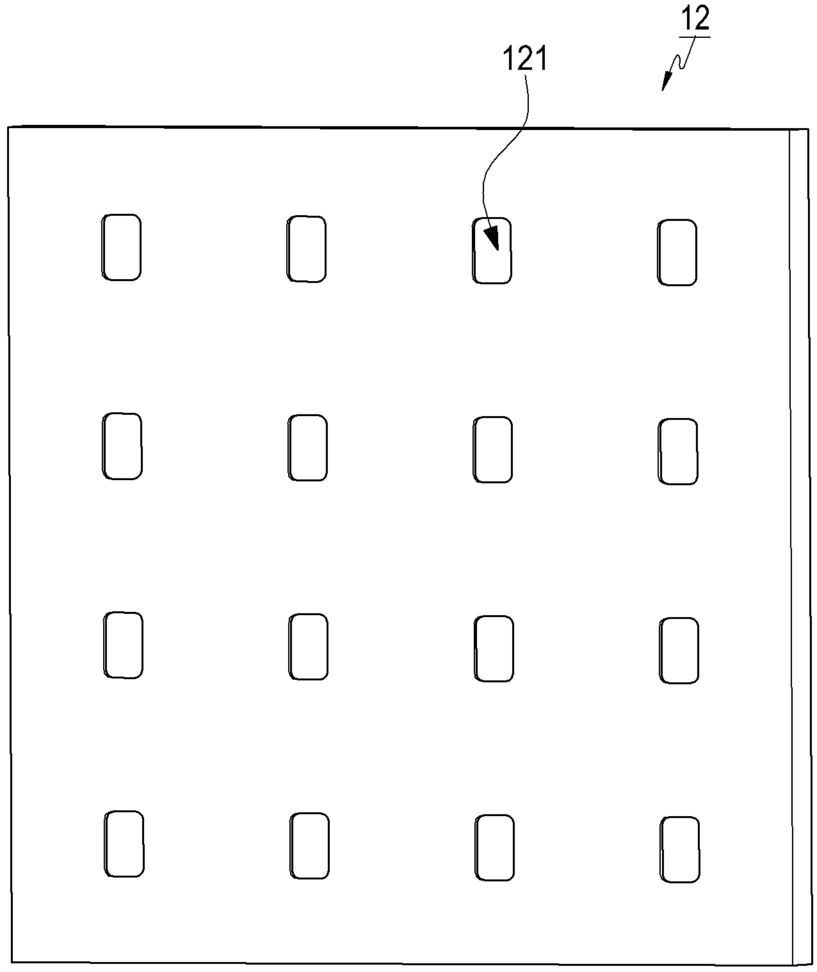
FIG. 11 is a perspective view of a distribution plate of FIG. 2 in a side direction.
Figure 12:
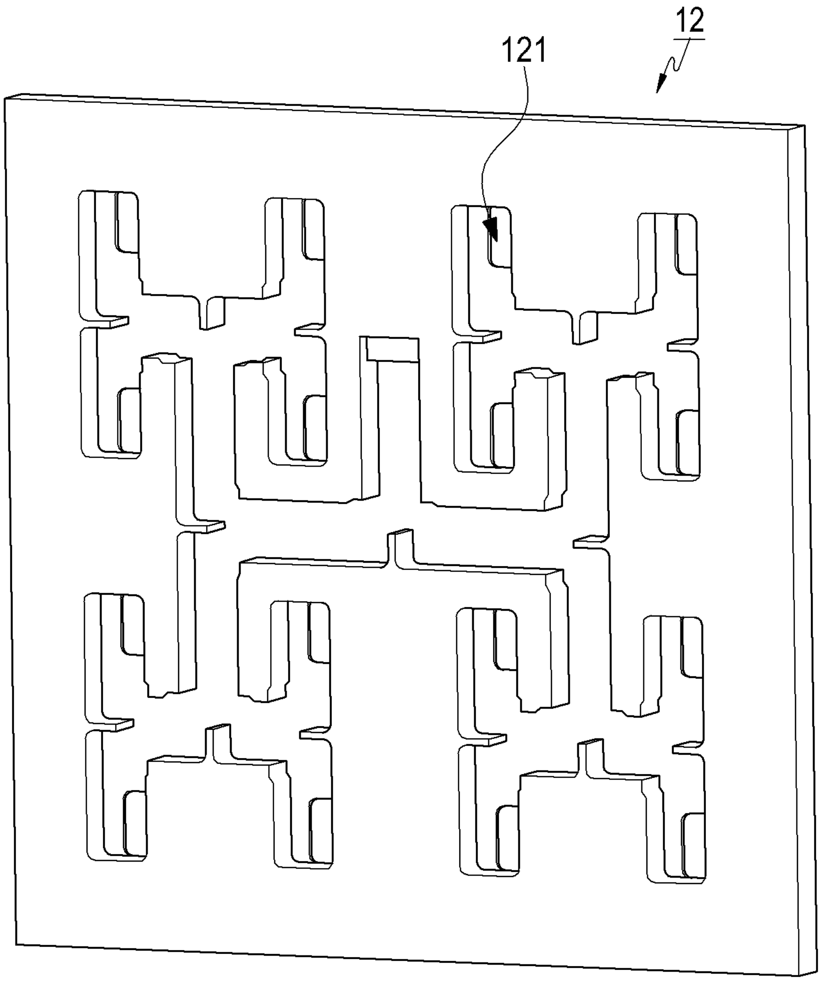
FIG. 12 is a perspective view of a distribution plate of FIG. 2 in another side direction.
Figure 13:
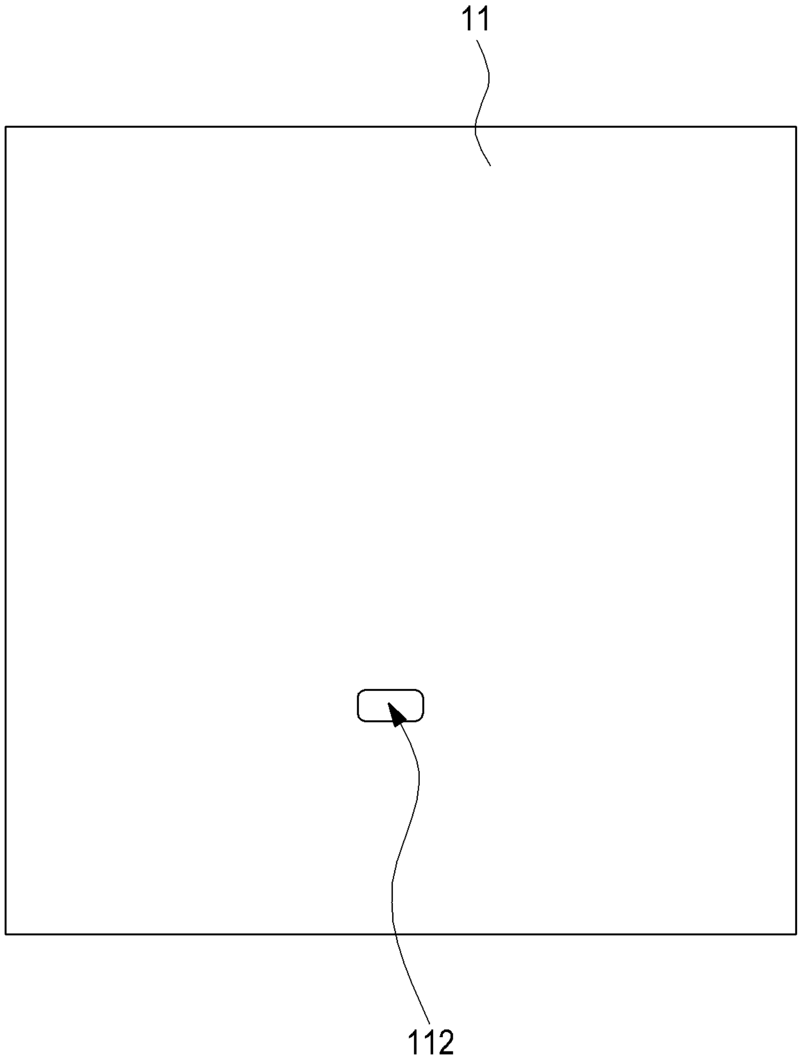
FIG. 13 is a plane view of a feeding plate shown in FIG. 2.

FIG. 8 is a perspective view of a side of the first auxiliary radiation plate 14 shown in FIG. 2, FIG. 9 is a perspective view of a top side (e.g., a front side along a signal radiation direction) of the radiation plate 13 shown in FIG. 2, FIG. 10 is a perspective view of a bottom side (e.g., a rear side in the signal radiation direction) of the radiation plate 13 shown in FIG. 2, FIGS. 11 and 12 are perspective views of a top side and a side of the distribution plate 12 shown in FIG. 2, and FIG. 13 is a plane view of the feeding plate 11 shown in FIG. 2. Referring to FIGS. 8 through 12, a basic structure and operations of a waveguide slot array antenna will be described in more detail. FIGS. 8 through 12 are views according to an order in which plates are installed from a top side to a bottom side, but the following description will be made based on signal input and a waveguiding path.

First, a waveguide (not shown) for guiding a signal input through an input connector (not shown), etc., is formed in a proper shape on a side with respect to a bottom surface of the feeding plate 11. The bottom surface of the feeding plate 11 may be formed to be, for example, several millimeters to several tens of millimeters. The feeding slot 112 is formed at a terminal of the waveguide of the feeding plate 11, and the feeding slot 112 may be a multistage slot to achieve matching according to a size of a distribution waveguide formed on the corresponding distribution plate 12. The rear surface of the feeding plate 11 may be processed to have a hole or a tab corresponding to an engagement portion of a normalized waveguide flange.

The distribution plate 12 connected with the feeding pate 11 has a distribution waveguide structure for distributing a signal input through the feeding slot 112 of the feeding plate 11 to the multiple coupling slots 122. The number of branched final branches of the distribution waveguide structure corresponds to distribution into a power of 2, and the branches are top-bottom and left-right symmetric. Such a distribution waveguide structure may have an electric field or magnetic field distribution structure. The electric field or magnetic field distribution structure may further include an iris structure and a septum structure, taking matching characteristics into account. In the distribution waveguide structure, the coupling slot 122 is formed at a terminal of each branched final branch. The coupling slot 122 is located one-sidedly by being offset from the center of a waveguide structure at the terminal of each final branch of the distribution waveguide structure, causing strong coupling. The main radiation plate 13 connected with the distribution plate 12 distributes a signal input through each coupling slot 122 of the distribution plate 12 in an equal or unequal ratio, and has a cavity structure for exciting the distributed signal through each excitation slot 132. Each coupling slot 122 of the distribution plate 12 is designed to be located in the center of a corresponding cavity of the main radiation plate 13. Each cavity may be structured to have, for example, four excitation slots 132 formed therein, and to properly form a resonance condition of each of the four excitation slots 132, a septum having a predetermined length is formed on and perpendicular to each surface of the cavity.

As shown in FIGS. 8 through 12, the feeding plate 11, the distribution plate 12, and the main radiation plate 13 may be designed, and the first auxiliary radiation plate 14 and the second auxiliary radiation plate 15 are designed correspondingly thereto. The feeding plate 11, the distribution plate 12, the main radiation plate 13, the first auxiliary radiation plate 14, and the second auxiliary radiation plate 15 are also aligned and mutually coupled to one another according to a designed structure. In this case, coupling between the plates may use screw engagement using a screw, soldering, high-frequency welding, or the like.

Figure 1A:
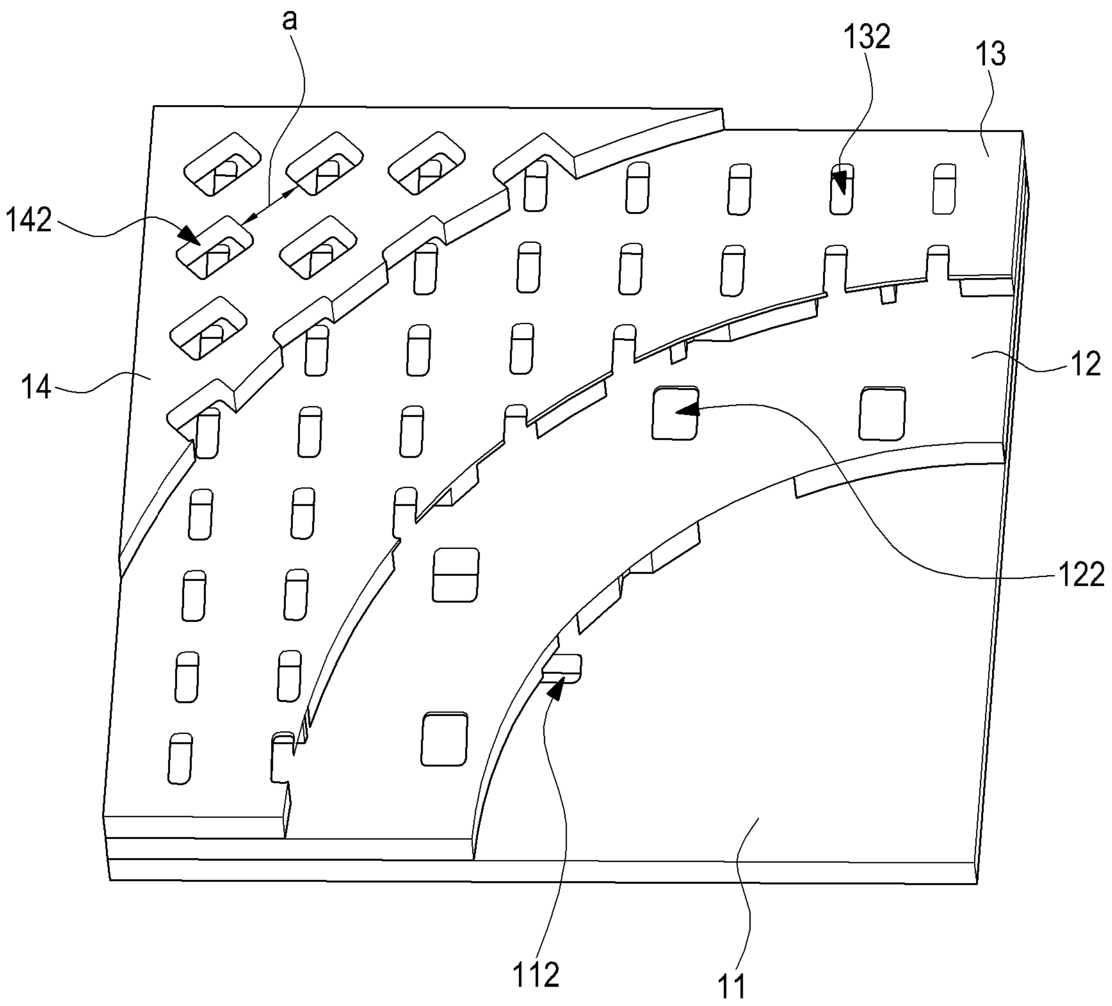
FIG. 1A is a perspective view in which each layer of a conventional waveguide slot array antenna is partially cut.
Figure 1B:
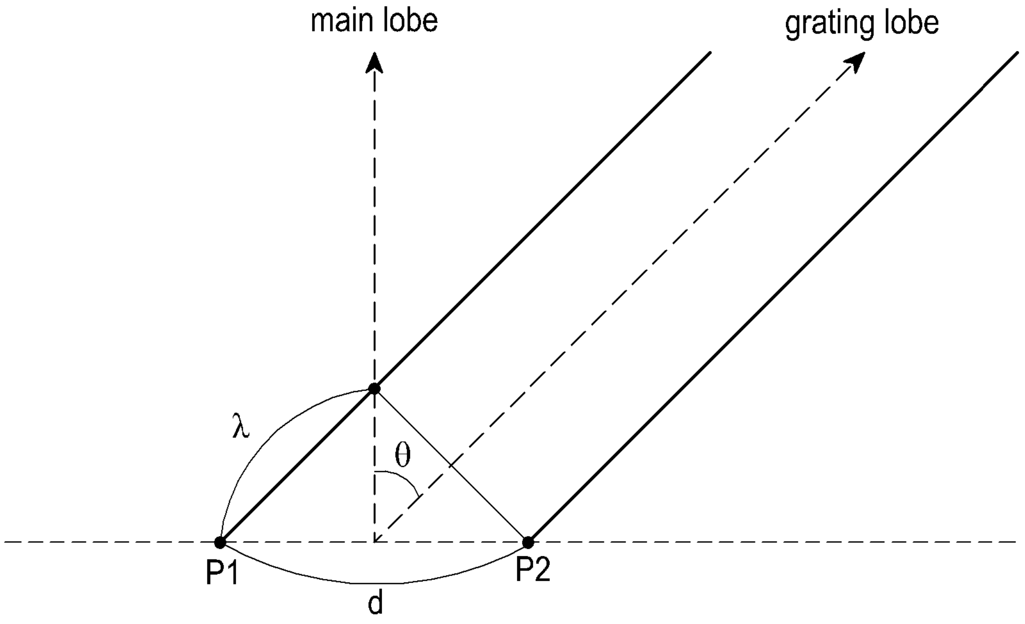
FIG. 1B is an exemplary view showing a state in which a grating lobe is produced in the waveguide slot array antenna shown in FIG. 1A.
Figure 14A:
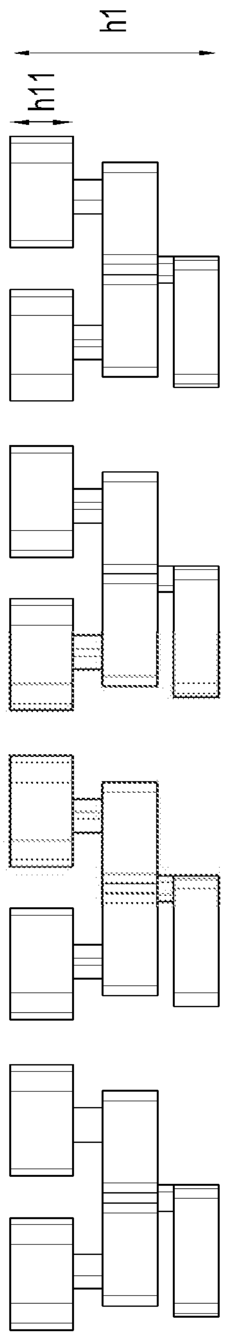
FIGS. 14A-14B are structural views of an internal signal waveguide path of a waveguide slot array antenna according to the first embodiment of the present disclosure.
Figure 14B:
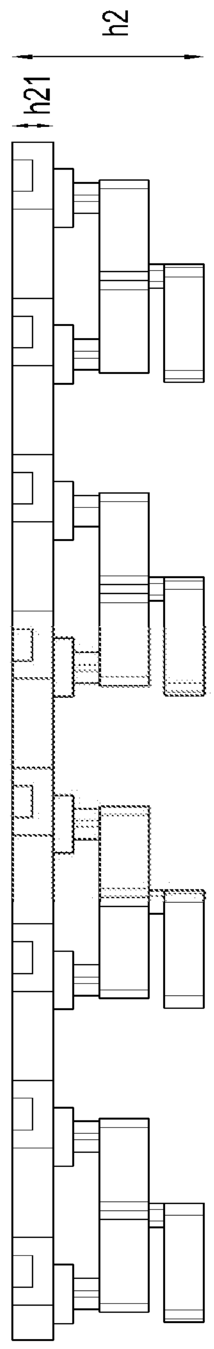
Figure 15:
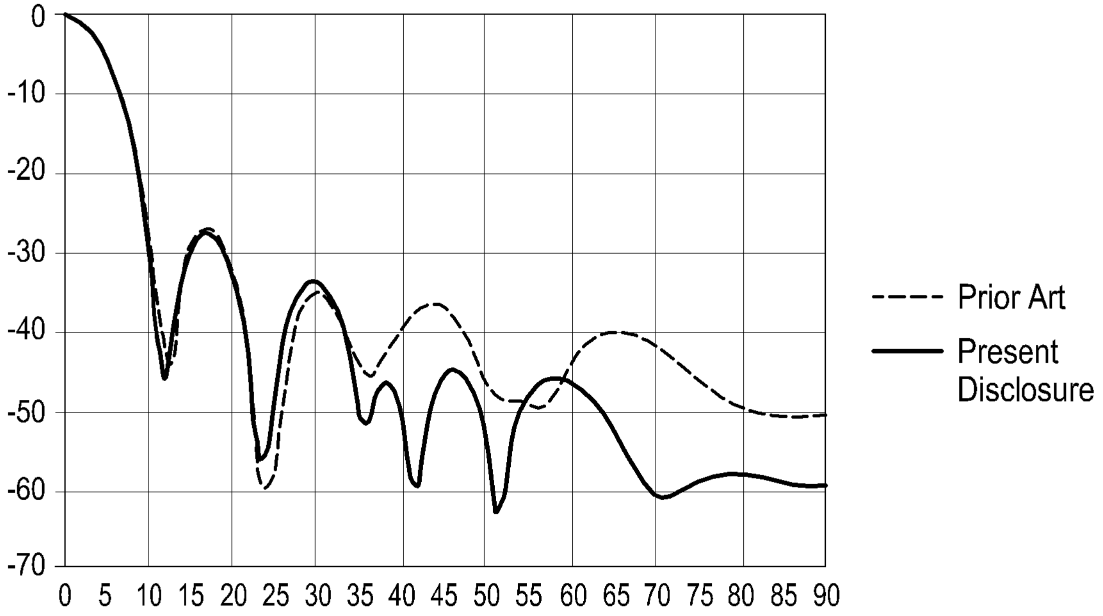
FIG. 15 is a graph showing grating lobe characteristics of the waveguide slot array antenna shown in FIGS. 14A-14B.
Figure 16A:
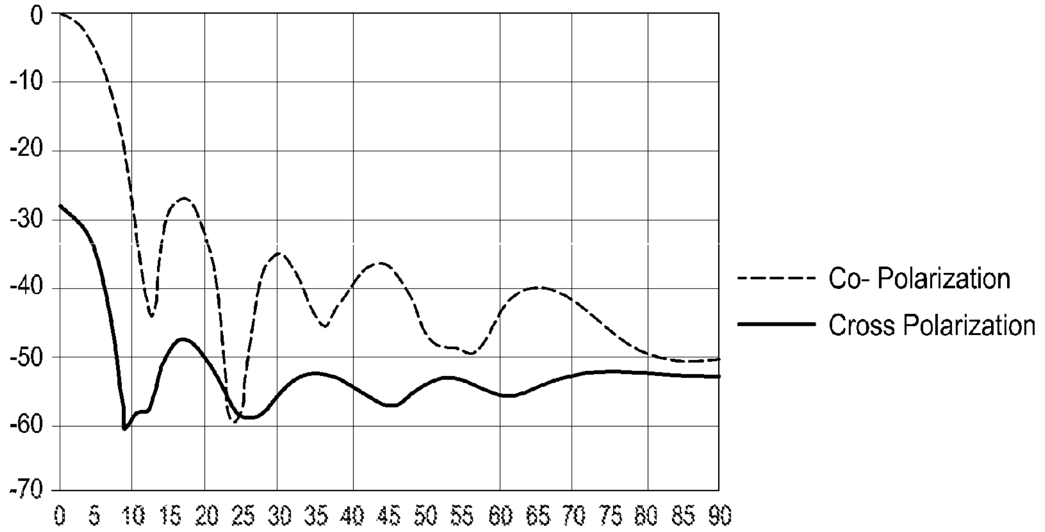
FIGS. 16A-16B are graphs showing cross polarization characteristics of a waveguide slot array antenna shown in FIGS. 14A-14B.
Figure 16B:
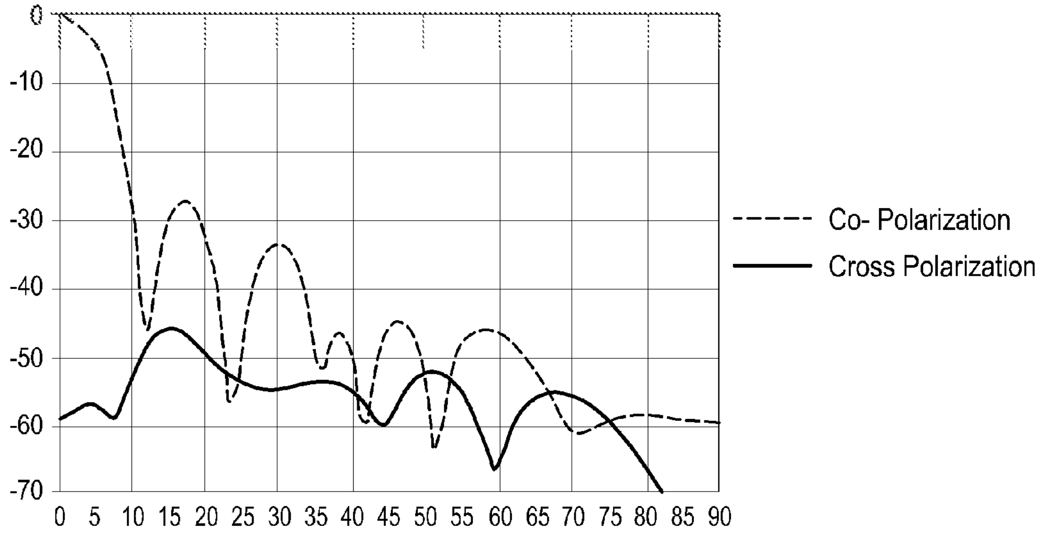

FIGS. 14A-14B are structural views of (a part of) an internal signal waveguide path of the waveguide slot array antenna according to the first embodiment of the present disclosure, in which a structure according to some embodiments of the present disclosure is shown in FIG. 14B, and an internal signal waveguide path (or a part thereof) of the conventional waveguide slot array antenna as shown in FIG. 1 is shown in FIG. 14A for comparison. FIG. 15 is a graph showing grating lobe characteristics of the waveguide slot array antenna shown in FIGS. 14A-14B, and FIGS. 16A-16B is a graph showing cross polarization characteristics of the waveguide slot array antenna shown in FIGS. 14A-14B. In FIGS. 16A-16B, a graph of characteristics according to the first embodiment of the present disclosure is shown in (b), and a graph of characteristics of the conventional waveguide slot array antenna as shown in FIG. 1 is shown in (a) for comparison.

Referring to FIGS. 14A through 16B, a waveguide slot array antenna according to the present disclosure may be regarded as further including the second auxiliary radiation plate 15 when compared to a conventional waveguide slot array antenna, and although one layer (plate) is physically further stacked, an overall height of the antenna may be the same as that of the conventional antenna. That is, as shown in FIGS. 14A-14B, an overall height h1 of the conventional antenna and an overall height h2 of the antenna according to the present disclosure may be equal to each other. In such a design, as shown in FIG. 15, grating lobe characteristics of the antenna according to the present disclosure are further improved in spite of primary and secondary side lobes having sizes equal to those of the conventional antenna.

In the waveguide slot array antenna, a height of a radiation slot at a final stage dominantly works as a determinant of cross polarization. As shown in FIGS. 14A-14B, a height h21 of a radiation slot (a second polarization slot) at a final stage of the antenna according to the present disclosure is designed to be smaller than a height h11 of a radiation slot (a first polarization slot) at a final stage of the conventional antenna. This results from the design in which the overall height of the antenna according to the present disclosure is equal to that of the conventional antenna, and it can be seen from FIGS. 16A-16B that even in such a design, there is no deterioration of cross polarization characteristics. Moreover, generally, a larger difference between co-polarization and cross polarization is regarded as more excellent performance, and as shown in FIGS. 16A-16B, it can be seen that the cross polarization characteristics of the antenna according to the present disclosure are significantly improved. In this way, the present disclosure may optimally design the height of the radiation slot at the final stage of the antenna.

Figure 17:
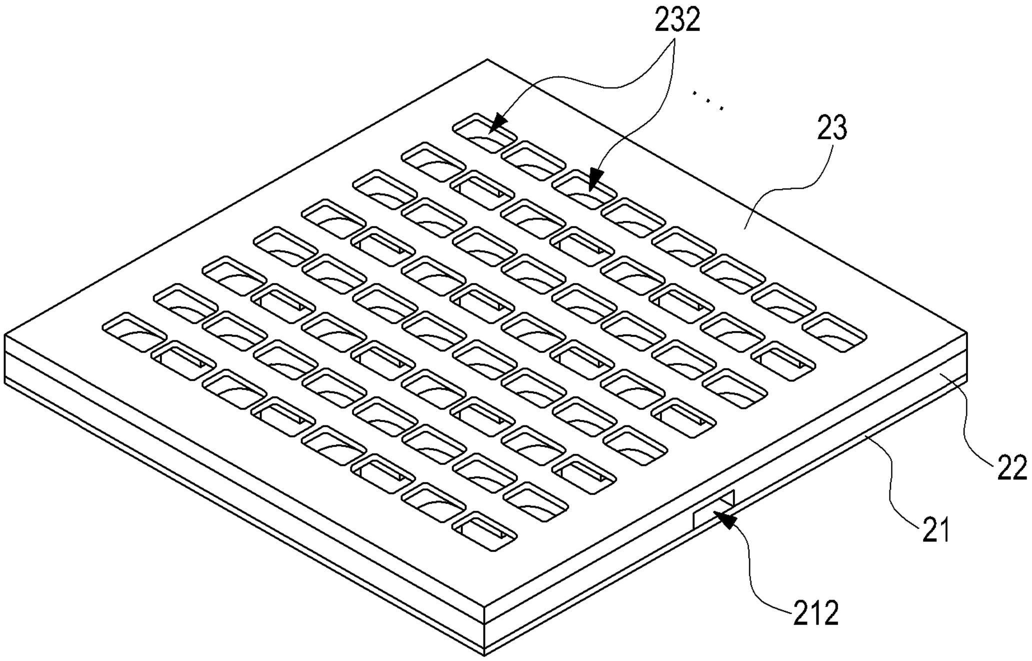
FIG. 17 is a perspective view of main portions of a waveguide slot array antenna for comparison with embodiments of the present disclosure.
Figure 18:
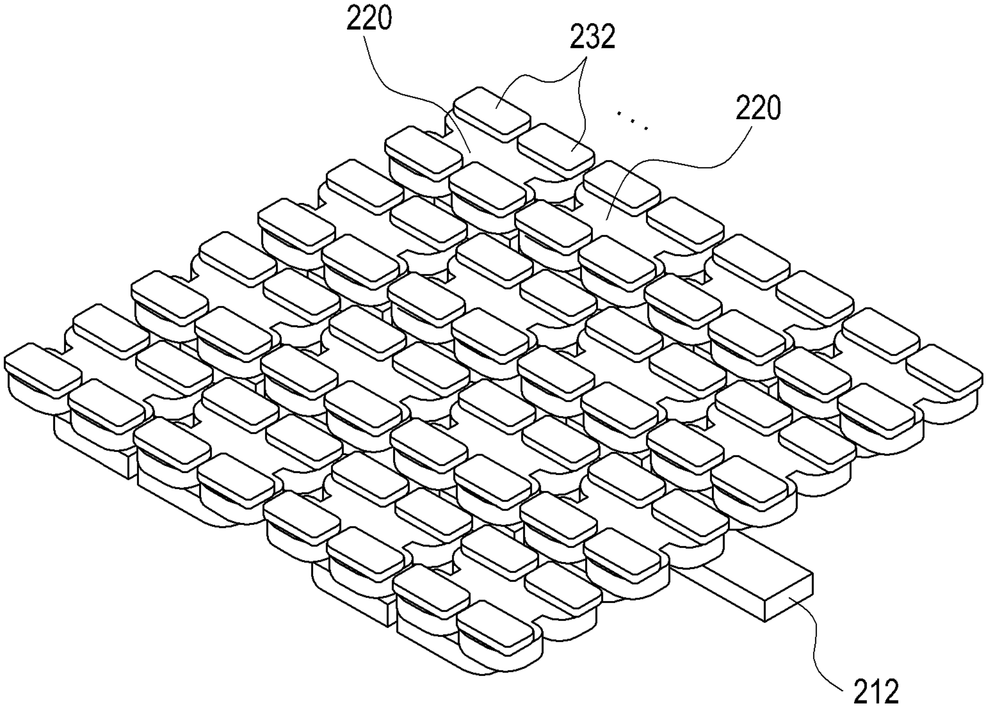
FIG. 18 is a structural view of an internal signal waveguide path of a waveguide slot array antenna shown in FIG. 17.

FIG. 17 is a perspective view of main portions of a waveguide slot array antenna for comparison with embodiments of the present disclosure, and FIG. 18 is a structural view of an internal signal waveguide path of the waveguide slot array antenna shown in FIG. 17. The waveguide slot array antenna shown in FIGS. 17 and 18 may basically include a structure in which the feeding plate 21, the distribution plate 22, and the radiation plate 23 are sequentially stacked in that order, like the structure according to the first embodiment shown in FIG. 2 and other drawings. Although not shown in FIGS. 17 and 18, auxiliary radiation plate(s) may be further installed on the radiation plate 23 to generate a polarized wave, similarly with the structure shown in FIG. 2 and other drawings.

In the structure shown in FIG. 2 and other drawings, a structure for providing an input signal through a feeding slot of a feeding plate is disclosed as an example, but in FIGS. 17 and 18, a structure for providing an input signal through a feeding waveguide 212 having an open section for signal input formed in a side of the distribution plate 22 is shown as an example. The distribution plate 22 forms the feeding waveguide 212 and a hollow region of a distribution waveguide structure for distributing a signal input through the feeding waveguide 212, and the feeding plate 21 may simply have the form of a flat plate.

In the structure shown in FIGS. 17 and 18, if a signal is input to the feeding waveguide 212, the signal is distributed in an equal ratio through the distribution plate 22 and the distributed signal is delivered to each cavity 220 formed in the radiation plate 23. The signal delivered to the cavity 220 of the radiation plate 23 is distributed and radiated, for example, in an equal ratio through, for example, four excitation slots 232 formed for each cavity 220. The excitation slots 232 are arranged to have a preset interval and preset arrangement therebetween according to an operating frequency.

As shown in FIGS. 17 and 18, generally, in a waveguide slot array antenna (and other planar antennas), an input signal is distributed into a power of 2, for example, equally, in the distribution plate 22, and the signal distributed and then finally radiated through the excitation slot 232 in the radiation plate 23 is distributed into a power of 2, such that the excitation slots 232 are arranged in the form of a power of 2, such as 2×<2, 4×4, or the like. For example, in the radiation plate 23 shown in FIGS. 17 and 18, a signal that is input through one coupling slot of the distribution plate 22 and delivered to one cavity of the radiation plate 23 is radiated through four excitation slots 232 formed for each cavity. Thus, this structure has an array of a total of 4×4, 8×8, 16×16, etc. excitation slots 232.

As such, generally, in the waveguide slot array antenna, a signal distribution structure uses an H-junction structure, thereby implementing a symmetric and efficient feeding network structure. However, due to such a structure, there are a limitation in horizontal and vertical beam patterns, a difficulty in the flexible design of a gain, and an unnecessarily large volume. Moreover, according to circumstances, in case of an asymmetric structure array design, the H-junction structure is not easy to adopt and a separate additional layer may be needed for implementation of a desired structure array, increasing an overall thickness and thus limiting a low-profile design.

In the structure of the radiation plate shown in FIGS. 17 and 18, an arrangement interval between excitation slots may be narrowed when compared to in other embodiments shown in FIG. 2 and other drawings, and thus, according to circumstances, when the first auxiliary radiation plate as shown in FIG. 2 is provided, a grating lobe may be suppressed without a need for the separate second auxiliary radiation plate on the first auxiliary radiation plate.

Figure 19:
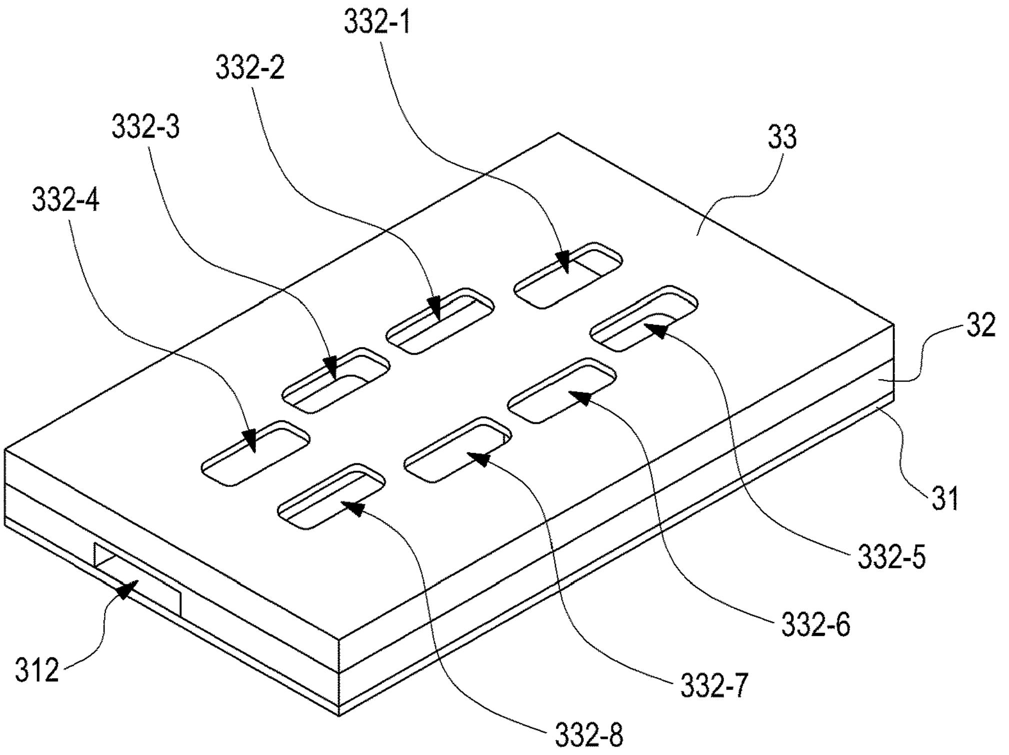
FIG. 19 is a perspective view of main portions of a waveguide slot array antenna according to a second embodiment of the present disclosure.
Figure 20:
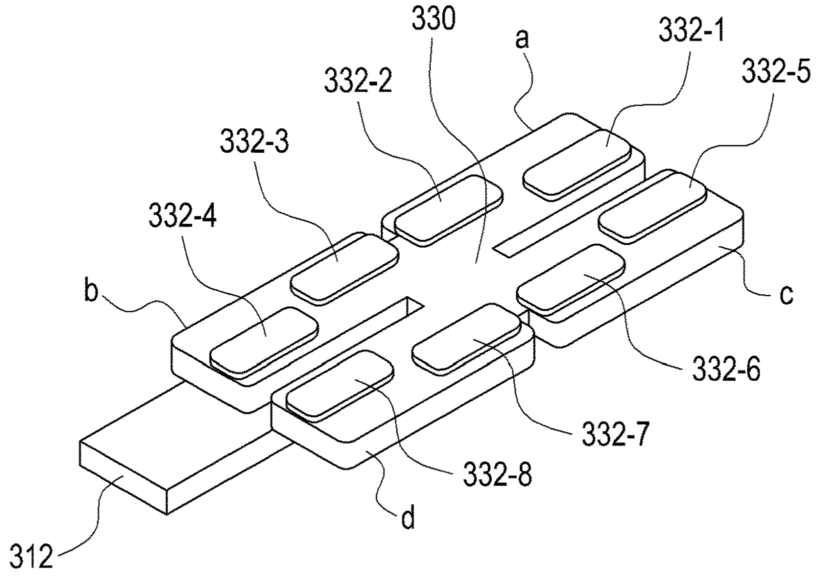
FIG. 20 is a structural view of an internal signal waveguide path of a waveguide slot array antenna shown in FIG. 19.

FIG. 19 is a perspective view of main portions of a waveguide slot array antenna according to a second embodiment of the present disclosure, and FIG. 20 is a structural view of an internal signal waveguide path of the waveguide slot array antenna shown in FIG. 19, showing an example of a basic structure in which excitation slots are arranged in a minimum array unit (e.g., 4×2). Referring to FIGS. 19 and 20, the waveguide slot array antenna according to the second embodiment of the present disclosure, like the structure shown in FIGS. 17 and 18, may include a feeding plate 31, a distribution plate 32 which is installed stacked on the feeding plate 31 and has a feeding waveguide 312 and a waveguide structure for delivering a signal input through the feeding waveguide 312 to a radiation plate 33 through a coupling slot (not shown), and the radiation plate 33 which is installed stacked on the distribution plate 32 and has multiple first through eighth excitation slots 332 (332-1, 332-2, 332-3 332-4, 332-5, 332-6, 332-7, and 332-8) formed therein and a cavity structure 330 which distributes the signal input through the coupling slot of the distribution plate 32 and excites the distributed signal through the excitation slots 332. Although not shown in FIGS. 18 and 19, auxiliary radiation plate(s) may be further installed on the radiation plate 33 to generate a polarized wave.

To be more specific regarding the structure of the radiation plate 33, the cavity structure 330 of the radiation plate 33 is divided into four first through fourth regions a, b, c, and d for distributing the signal provided from the distribution plate 32, for example, equally, into four parts, and correspondingly, septums having a predetermined length are formed on and perpendicular to each surface of the cavity. In each of the four regions a, b, c, and d of the cavity structure 330, two excitation slots are formed unlike in the structure shown in FIGS. 17 and 18. For example, in the cavity structure 330, in the first region a, the first and second excitation slots 332-1 and 332-2 may be formed and designed such that the centers thereof are offset from an array reference axis (e.g., a vertical axis) in opposite directions to each other. Such an array structure of the excitation slots enables a strength of a signal provided to each excitation slot to be as strong as possible and to be equally distributed. Likewise, the third and fourth excitation slots 332-3 and 332-4 may be formed in the second region b, the fifth and sixth excitation slots 332-5 and 332-6 may be formed in the third region c, and the seventh and eighth excitation slots 332-7 and 332-8 may be formed in the fourth region d.

In the structure shown in FIGS. 19 and 20, it can be seen that the distribution plate 32 merely delivers the signal input through the feeding waveguide 312 to the radiation plate 33 through one coupling slot, without actually distributing the signal. This is because the excitation slot array structure shown in FIGS. 19 and 20 is shown as having a minimum array unit of, e.g., 4∴2 (width×length) for convenience of a description. It would be understood that when such a minimum array unit structure is repeatedly provided, the distribution plate 32 may distribute the input signal through repeatedly provided minimum array unit structures.

Figure 21:
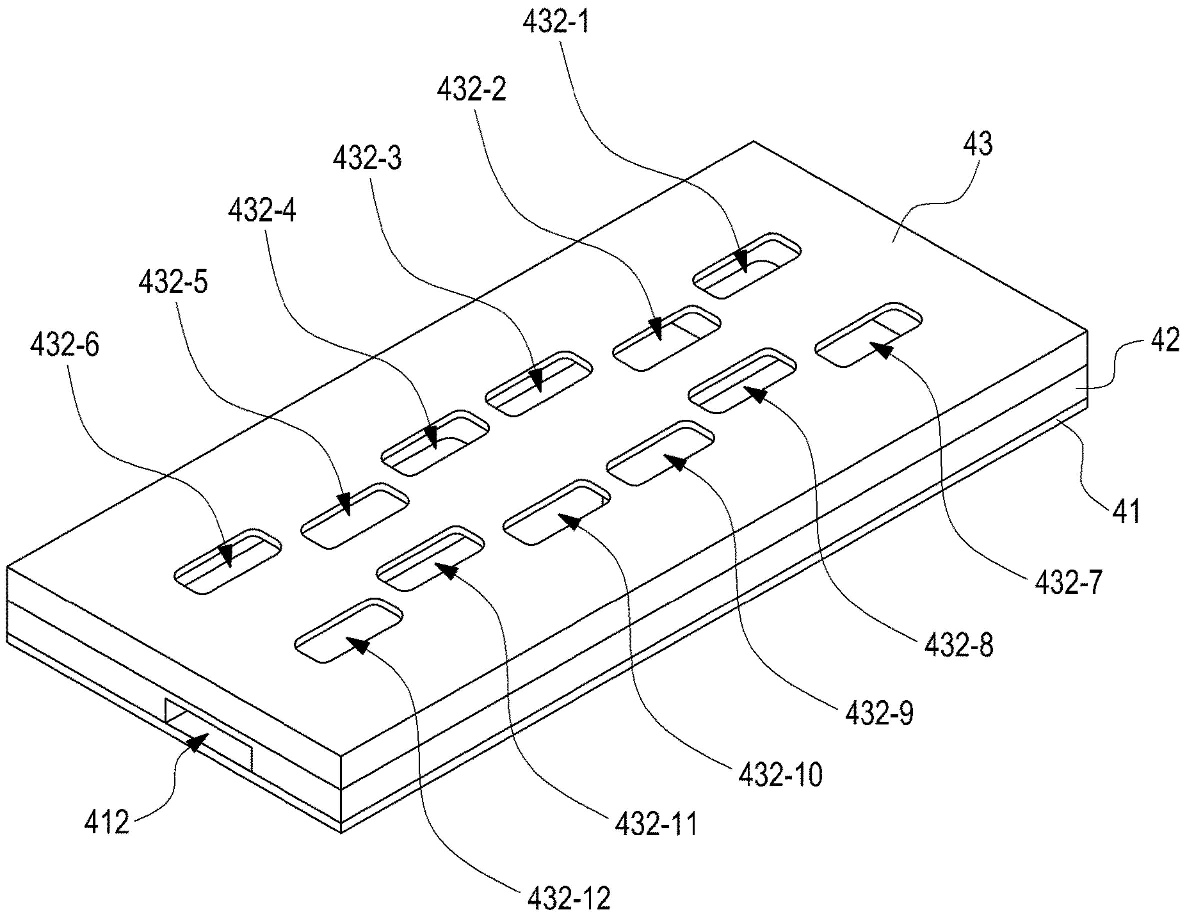
FIG. 21 is a perspective view of main portions of a waveguide slot array antenna according to a third embodiment of the present disclosure.
Figure 22:
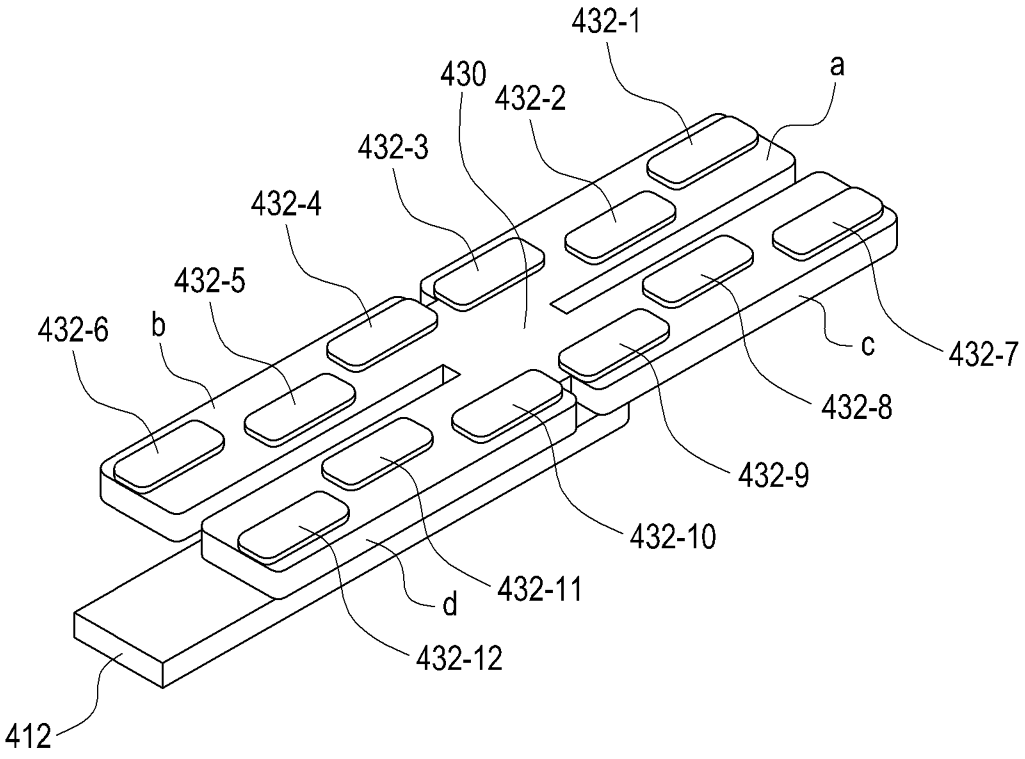
FIG. 22 is a structural view of an internal signal waveguide path of a waveguide slot array antenna shown in FIG. 21.

FIG. 21 is a perspective view of main portions of a waveguide slot array antenna according to a third embodiment of the present disclosure, and FIG. 22 is a structural view of an internal signal waveguide path of the waveguide slot array antenna shown in FIG. 21, showing an example of a basic structure in which excitation slots are arranged in a minimum array unit (e.g., 6×2). Referring to FIGS. 21 and 22, the waveguide slot array antenna according to the third embodiment of the present disclosure, like the structure shown in FIGS. 19 and 21, may include a feeding plate 41, a distribution plate 42 which is installed stacked on the feeding plate 41 and has a feeding waveguide 412 and a waveguide structure for delivering a signal input through the feeding waveguide 412 to a radiation plate 43 through a coupling slot (not shown), and the radiation plate 43 which is installed stacked on the distribution plate 42 and has multiple first through twelfth excitation slots 432 (432-1, 432-2, 432-3 432-4, 432-5, 432-6, 432-7, 432-8, 432-9, 432-10, 432-11, and 432-12) formed therein and a cavity structure 430 for distributing the signal input through the coupling slot of the distribution plate 42 and exciting the distributed signal through the excitation slots 432. In addition, auxiliary radiation plate(s) may be further installed on the radiation plate 43 to generate a polarized wave.

To be more specific regarding the structure of the radiation plate 43, the cavity structure 430 of the radiation plate 43 is divided into four first through fourth regions a, b, c, and d for distributing the signal provided from the distribution plate 42, for example, equally, into four parts, and correspondingly, septums having a predetermined length are formed on and perpendicular to each surface of the cavity. In each of the four regions a, b, c, and d of the cavity structure 430, three excitation slots are formed unlike in the structure shown in FIGS. 19 and 20. That is, in the cavity structure 430, in the first region a, the first through third excitation slots 432-1, 432-2, and 432-3 are formed and are designed such that the centers thereof are offset from an array reference axis (e.g., a vertical axis) in opposite directions to that (those) of the adjacent excitation slot(s). Needless to say, such an array structure of the excitation slots enables a strength of a signal provided to each excitation slot to be as strong as possible and to be equally distributed. Likewise, the third through sixth excitation slots 432-4, 432-5, and 432-6 are formed in the second region b, the seventh through ninth excitation slots 432-7, 432-8, and 432-9 are formed in the third region c, and the tenth through twelfth excitation slots 432-10, 432-11, and 432-12 are formed in the fourth region d.

As shown in FIGS. 19 through 22, the waveguide slot array antenna according to the second and third embodiments of the present disclosure may provide flexibility to the design of the excitation slot array structure of the radiation plate when compared to a general array structure of the power of 2. Thus, an overall antenna structure implements maximum directivity for an arbitrary size and maintains a low-profile structure as a whole. In particular, by properly applying the structures according to the second and third embodiments, the waveguide slot array antenna having various array structures may be easily implemented.

Figure 23:
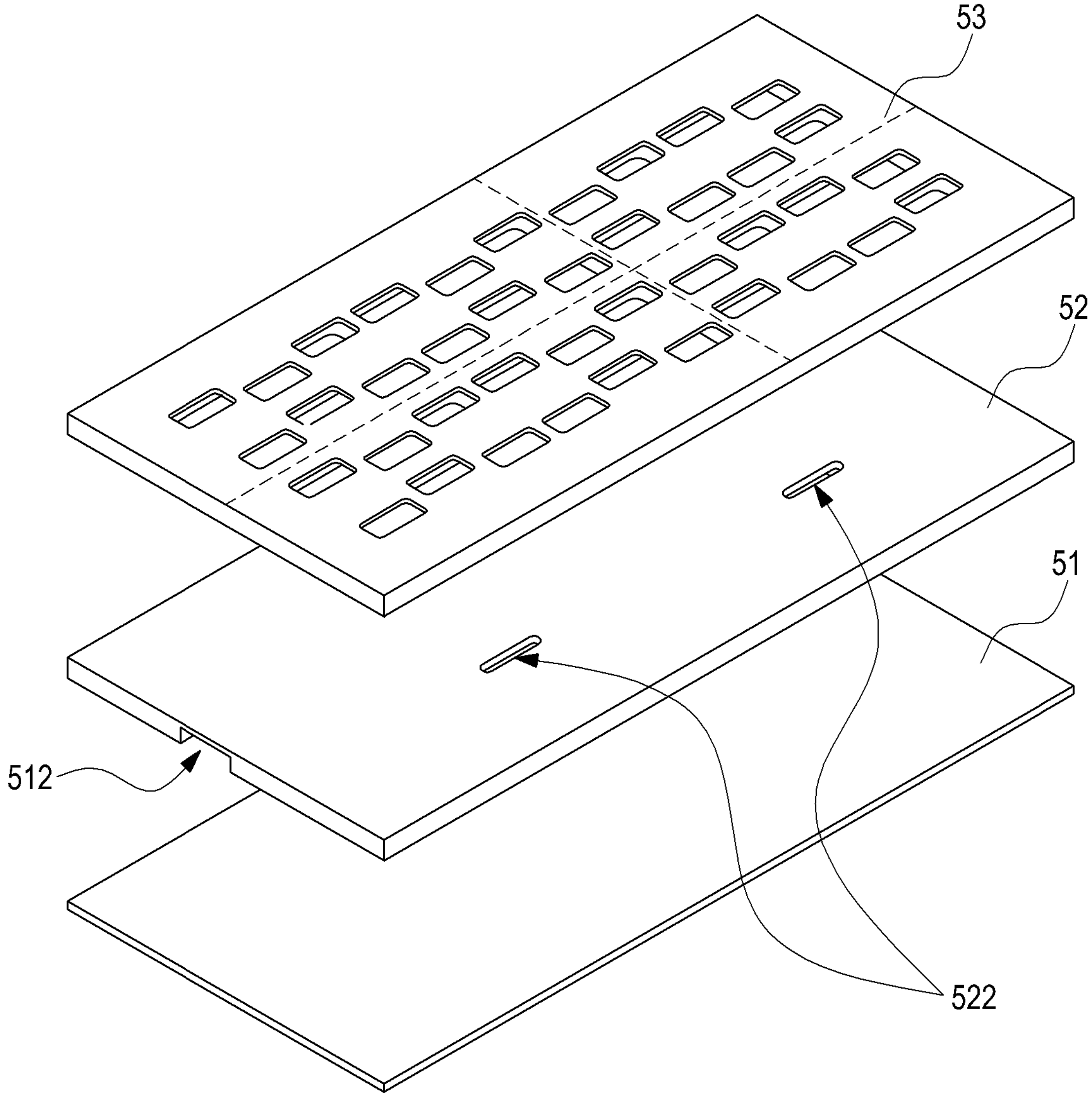
FIG. 23 is an exploded perspective view of main portions of a waveguide slot array antenna according to a fourth embodiment of the present disclosure, viewed from a side.
Figure 24:
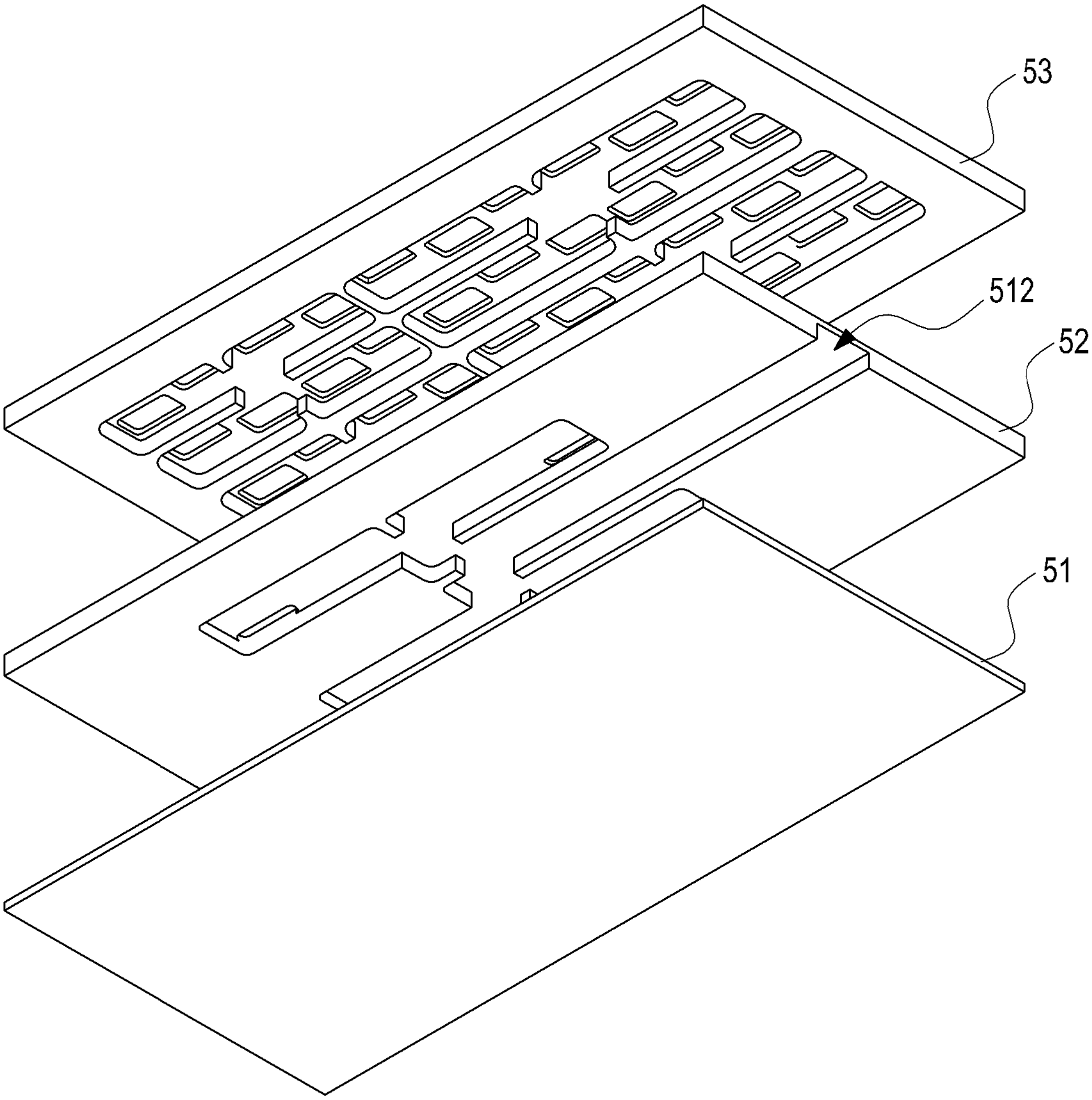
FIG. 24 is an exploded perspective view of a waveguide slot array antenna of FIG. 23, viewed from another side.
Figure 25:
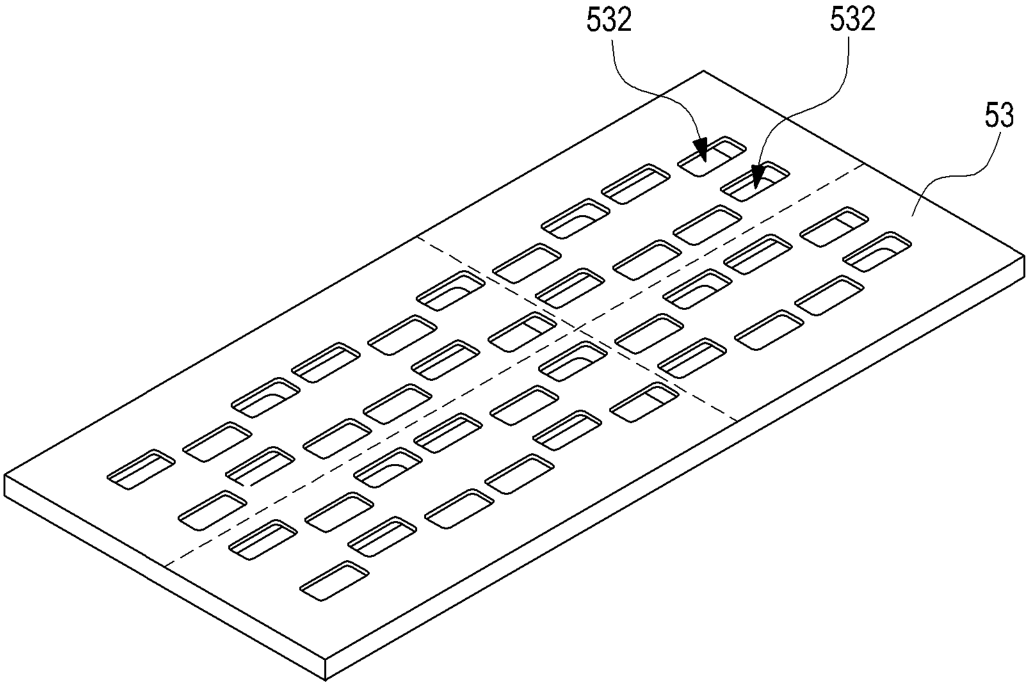
FIG. 25 is a perspective view of a radiation plate of FIG. 23, viewed from a side.
Figure 26:
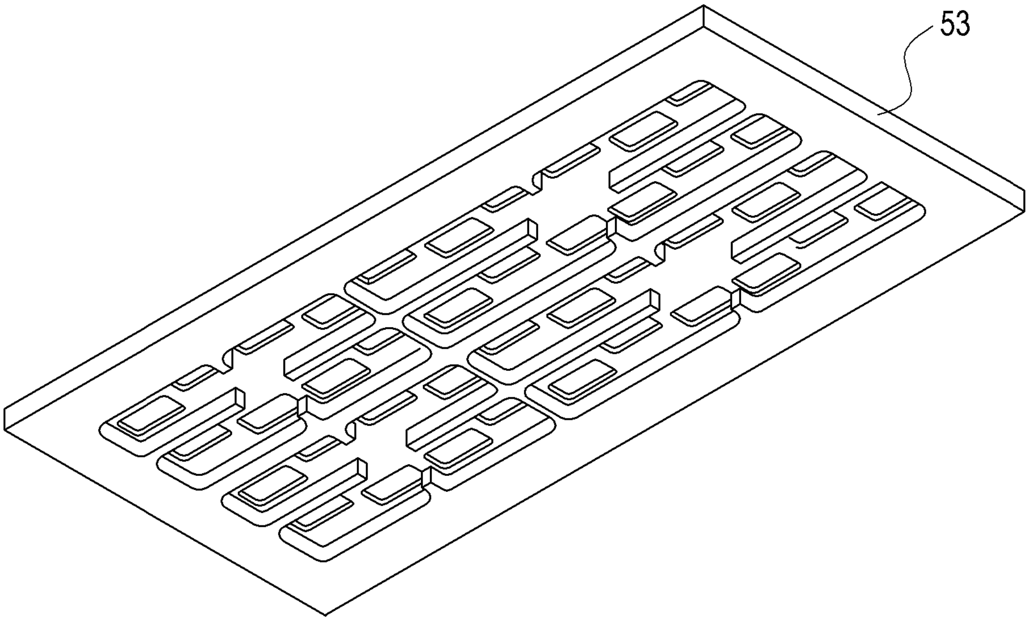
FIG. 26 is a perspective view of a radiation plate of FIG. 23, viewed from another side.
Figure 27:
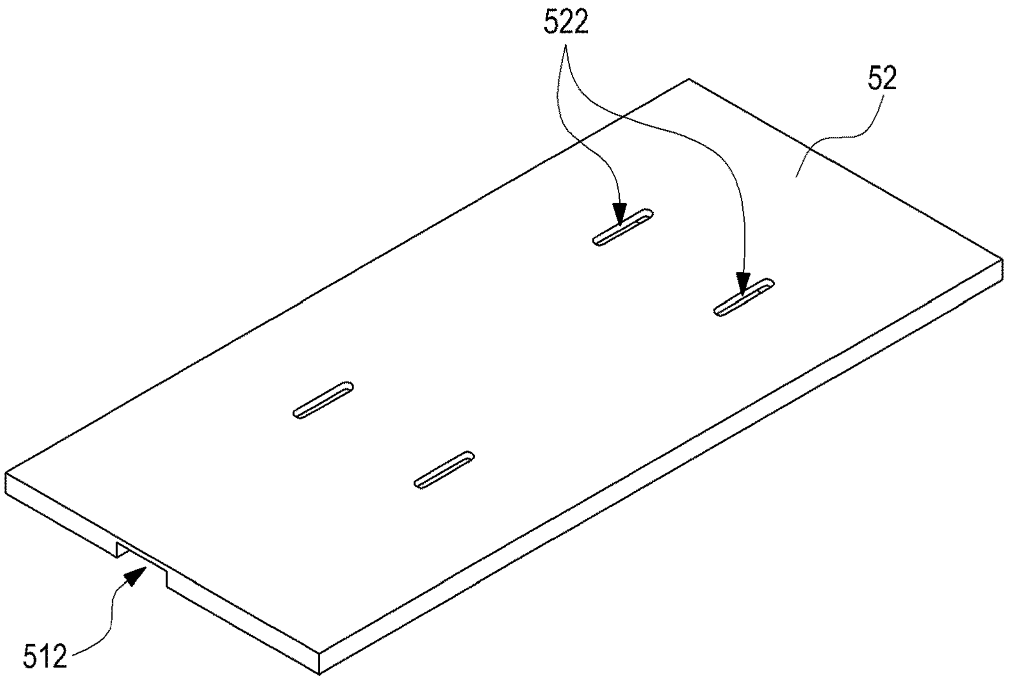
FIG. 27 is a perspective view of a distribution plate of FIG. 23, viewed from a side.
Figure 28:
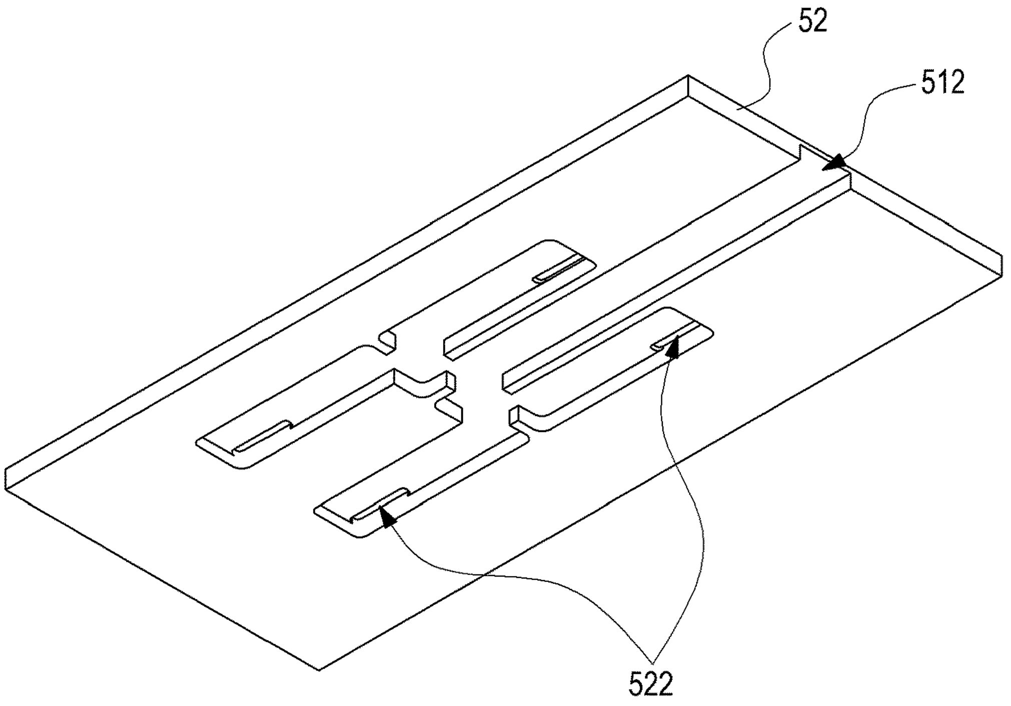
FIG. 28 is a perspective view of a distribution plate of FIG. 23, viewed from another side.

FIG. 23 is an exploded perspective view of main portions of a waveguide slot array antenna according to a fourth embodiment of the present disclosure, viewed from a side (e.g., a top side), FIG. 24 is an exploded perspective view of the waveguide slot array antenna of FIG. 23, viewed from another side (e.g., a bottom side), FIGS. 25 and 26 are perspective views of a radiation plate 53 of FIG. 23, viewed from a side and another side, respectively, and FIGS. 27 and 28 are perspective views of a distribution plate 52 of FIG. 23, viewed from a side and another side, respectively, in which excitation slots have an array structure of, for example, 10×4 (length×width).

Referring to FIGS. 23 through 28, the waveguide slot array antenna according to the fourth embodiment, like the structure according to other embodiments, may include a feeding plate 51, a distribution plate 52 which is installed stacked on the feeding plate 51 and has a feeding waveguide 512 and a distribution waveguide structure for equally or unequally distributing and delivering a signal input through the feeding waveguide 512 to the radiation plate 53 through multiple coupling slots 522 designed to be, for example, a power of 2, and the radiation plate 53 which is installed stacked on the distribution plate 52 and has excitation slots formed therein and a cavity structure for distributing the signal input through the multiple coupling slots 522 of the distribution plate 52 and exciting the distributed signal through the excitation slots. In addition, auxiliary radiation plate(s) may be further installed on the radiation plate 53 to generate a polarized wave.

To be more specific regarding the structure of the radiation plate 53, the radiation plate 53 according to the fourth embodiment of the present disclosure is structured by repeatedly using and properly arranging and connecting the radiation plates according to the other preceding embodiments. For example, as shown in FIG. 23, the radiation plate 53 having a 10×4 array structure is structured such that a 4×2 minimum array unit structure according to the second embodiment shown in FIGS. 19 and 20 is applied to two regions, e.g., the region a and the region c (thus forming, e.g., a 4×4 array structure) and a 6×2 minimum array unit structure according to the third embodiment shown in FIGS. 21 and 22 is applied to two regions, e.g., the region b and the region d (thus forming, e.g., a 6×4 array structure). That is, the radiation plate 53 shown in FIG. 23 is implemented by applying a total of four minimum array unit structures including two minimum array unit structures according to the second embodiment and two minimum array unit structures according to the fourth embodiment, and in this case, the distribution plate 52 has a structure for equally or unequally distributing an input signal to each of the four minimum array unit structures.

Figure 29:
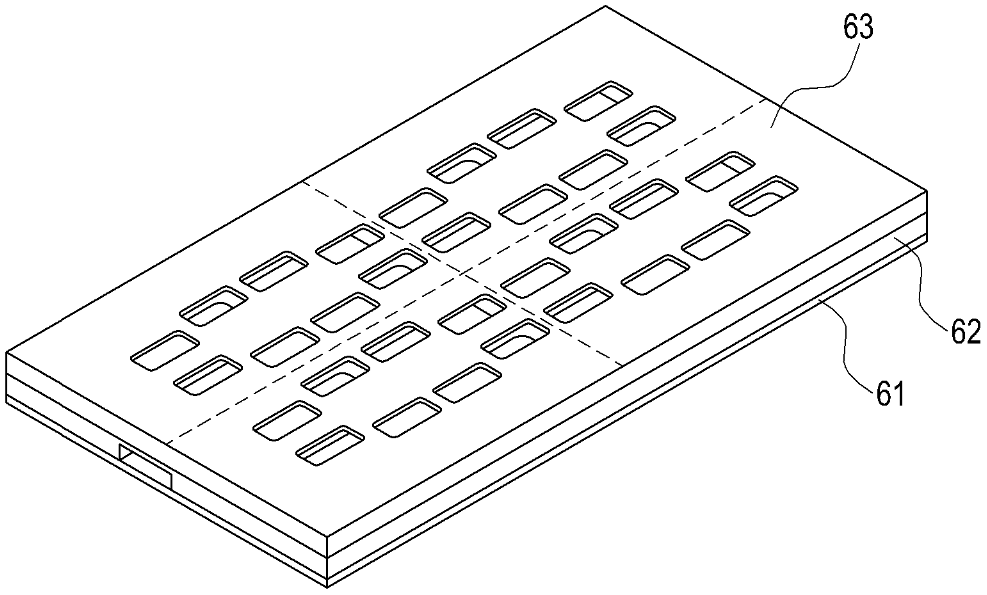
FIG. 29 is a perspective view of main portions of a waveguide slot array antenna according to a fifth embodiment of the present disclosure.

FIG. 29 is a perspective view of main portions of a waveguide slot array antenna according to a fifth embodiment of the present disclosure, in which excitation slots have, for example, an 8×4 (length×width) array structure. Referring to FIG. 29, the waveguide slot array antenna according to the fifth embodiment of the present disclosure is structured such that a feeding plate 61, a distribution plate 62, and a radiation plate 63 are sequentially stacked in that order, like in the structure according to the fourth embodiment shown in FIGS. 23 through 28.

In this case, as shown in FIG. 29, the radiation plate 63 having the 8×4 array structure may be implemented by using and connecting four 4×2 minimum array unit structures according to the second embodiment shown in FIGS. 19 and 20.

Figure 30:
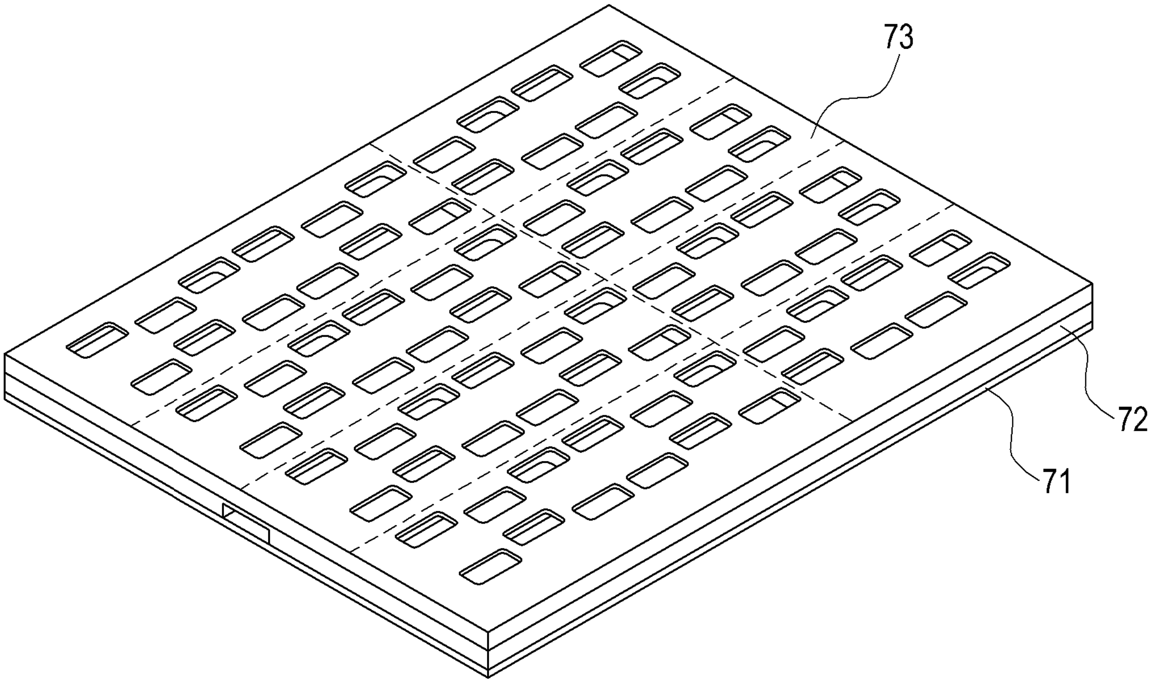
FIG. 30 is a perspective view of main portions of a waveguide slot array antenna according to a sixth embodiment of the present disclosure.

FIG. 30 is a perspective view of main portions of a waveguide slot array antenna according to a sixth embodiment of the present disclosure, in which excitation slots have, for example, an 10×8 (length×width) array structure. Referring to FIG. 30, the waveguide slot array antenna according to the sixth embodiment of the present disclosure is structured such that a feeding plate 71, a distribution plate 72, and a radiation plate 73 are sequentially stacked in that order, like in the structure according to the fourth embodiment shown in FIGS. 23 through 28.

In this case, the radiation plate 73 having the 10×8 array structure shown in FIG. 30 may be implemented by using and connecting four 4×2 minimum array unit structures according to the second embodiment shown in FIGS. 19 and 20 and four 6×2 minimum array unit structures according to third embodiment shown in FIGS. 21 and 22.

The structure and operations of the waveguide slot array antenna according to the embodiments of the present disclosure may be as described above, and while the detailed embodiments have been described in the description of the present disclosure, various modifications may be made without departing from the scope of the present disclosure.

For example, the detailed structures of the feeding plate 11, the distribution plate 12, and the main radiation plate 13 to which the auxiliary radiation plate(s) according to the first embodiment is applied have been described above, but the auxiliary radiation plate(s) according to the present disclosure may be applied to waveguide slot array antennas with various structures having radiation slot arrays as well as the described structures. That is, in the waveguide slot array antennas having various structures, like in the structure according to the first embodiment of the present disclosure, first and second auxiliary radiation plates in which first and second polarization slots are formed correspondingly to a radiation slot array may be installed to generate a polarized wave.

Although a plurality of minimum array unit structures according to the second and third embodiments are used for extended array structures according to the fourth through sixth embodiments as an example in the foregoing description, a plurality of minimum array unit structures according to the second and third embodiments may be used to properly implement other array structures.

In addition, in the structures according to the second through sixth embodiments, a feeding waveguide is formed on a distribution plate as an example, but like in the structure according to the first embodiment, a structure in which a feeding slot is formed in a feeding plate may also be adopted.

As such, various modifications may be made to the present disclosure, and thus the scope of the present disclosure should be defined by the appended claims and equivalents thereof, rather than by the described embodiments.

What is claimed is:

1. A waveguide slot array antenna, comprising:

a main radiation plate having a plurality of excitation slots that radiates a signal corresponding to an operating frequency;

a first auxiliary radiation plate installed on the main radiation plate and configured to rotate a polarization plane of the signal radiated by the plurality of excitation slots of the main radiation plate; and a second auxiliary radiation plate installed on the first auxiliary radiation plate and configured to distribute and radiate the signal having the polarization plane rotated by the first auxiliary radiation plate, wherein the first auxiliary radiation plate comprises a plurality of first polarization slots, and wherein each of the first polarization slots has a substantially uniform width throughout a length direction;

wherein the second auxiliary radiation plate comprises a plurality of second polarization slots formed for each first polarization slot of the first auxiliary radiation plate.

2. The waveguide slot array antenna of claim 1, wherein the plurality of first polarization slots have a structure corresponding to the plurality of excitation slots of the main radiation plate, and the plurality of first polarization slots is structured to rotate a polarization plane of the signal radiated by the plurality of excitation slots.

3. The waveguide slot array antenna of claim 2, wherein each of the plurality of first polarization slots has a shape that is similar to each of the plurality of excitation slots, and the plurality of first polarization slots is rotated at 45 degrees with respect to the plurality of excitation slots.

4. The waveguide slot array antenna of claim 2, a distribution structure for distributing a signal radiated for each of the plurality of first polarization slots of the first auxiliary radiation plate to the plurality of second polarization slots corresponding to the first polarization slot is formed in the second auxiliary radiation plate.

5. The waveguide slot array antenna of claim 3, wherein a shape of each of the plurality of first polarization slots and a shape of each of the second polarization slots are the same as each other.

6. The waveguide slot array antenna of claim 1, further comprising:

a feeding plate which forms at least a part of a waveguide to be provided with an input signal; and a distribution plate which comprises a distribution waveguide structure coupled to the feeding plate to distribute the input signal to multiple coupling slots, wherein the main radiation plate is installed on the distribution plate and comprises multiple cavity structures for distributing a signal input through each coupling slot of the distribution plate in an equal ratio and exciting the distributed signal through the plurality of excitation slots.

7. The waveguide slot array antenna of claim 6, wherein each of the multiple cavity structures of the main radiation plate are designed to be divided into four regions for distributing the signal provided to a corresponding coupling slot of the distribution plate to four parts, and a plurality of excitation slots are formed in each of the four regions.

8. The waveguide slot array antenna of claim 4, wherein the plurality of first polarization slots and the plurality of second polarization slots are oriented in a same direction.

9. The waveguide slot array antenna of claim 4, wherein a number of the plurality of second polarization slots is approximately twice a number of the plurality of first polarization slots.

10. The waveguide slot array antenna of claim 4, wherein each of the plurality of first polarization slots corresponds to two of the plurality of second polarization slots.

* * * * *